United States Patent
Kinouchi et al.

(10) Patent No.: US 6,646,981 B1
(45) Date of Patent: Nov. 11, 2003

(54) TRANSMISSION APPARATUS AND COMMUNICATION NETWORK CAPABLE OF DETECTING A PERIOD OF TIME WITH A LINE AFFECTED DUE TO A FAILURE OF A POWER SUPPLY

(75) Inventors: Kenya Kinouchi, Kawasaki (JP); Takeshi Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/362,170

(22) Filed: Jul. 27, 1999

(30) Foreign Application Priority Data

Jan. 14, 1999 (JP) .......................................... 11-007761

(51) Int. Cl.$^7$ ................................................. H04J 3/14
(52) U.S. Cl. ........................ 370/216; 370/248; 370/252; 714/4; 714/14; 714/22
(58) Field of Search ................................ 370/216, 217, 370/218, 219, 220, 221, 222, 223, 224, 227, 228, 248, 252; 714/1, 2, 4, 14, 22; 377/32

(56) References Cited

U.S. PATENT DOCUMENTS

| | | | |
|---|---|---|---|
| 4,390,984 A | * | 6/1983 | Sugiura et al. ............. 370/224 |
| 4,672,373 A | * | 6/1987 | Mori et al. ................. 370/222 |
| 4,956,835 A | * | 9/1990 | Grover ....................... 370/228 |
| 4,987,363 A | * | 1/1991 | Gibbs et al. ................ 324/142 |

FOREIGN PATENT DOCUMENTS

| | | | |
|---|---|---|---|
| JP | 2-148951 | 6/1990 | ............ H04M/3/10 |
| JP | 7-46336 | 2/1995 | .......... H04M/11/00 |

* cited by examiner

*Primary Examiner*—Dang Ton
*Assistant Examiner*—Shick Hom
(74) *Attorney, Agent, or Firm*—Katten Muchin Zavis Rosenman

(57) ABSTRACT

A transmission apparatus comprises a power-supply unit, a first detection unit for detecting a power-supply recovery of the power-supply unit, a request unit which is used for transmitting a demanding command to an adjacent transmission apparatus completing line setting based on line-setting information to request the adjacent apparatus to transmit alarm information when the first detection unit detects a power-supply recovery, wherein the alarm information includes disabled-reception and recovered-reception times, that is, times at which reception of a signal from the transmission apparatus is disabled and recovered respectively, a first reception unit for receiving the alarm information from the adjacent transmission apparatus and a second detection unit for detecting a period of time with a transmission line affected between a disabled-reception time and a recovered-reception time of the adjacent transmission apparatus included in the alarm information received by the first reception unit.

10 Claims, 22 Drawing Sheets

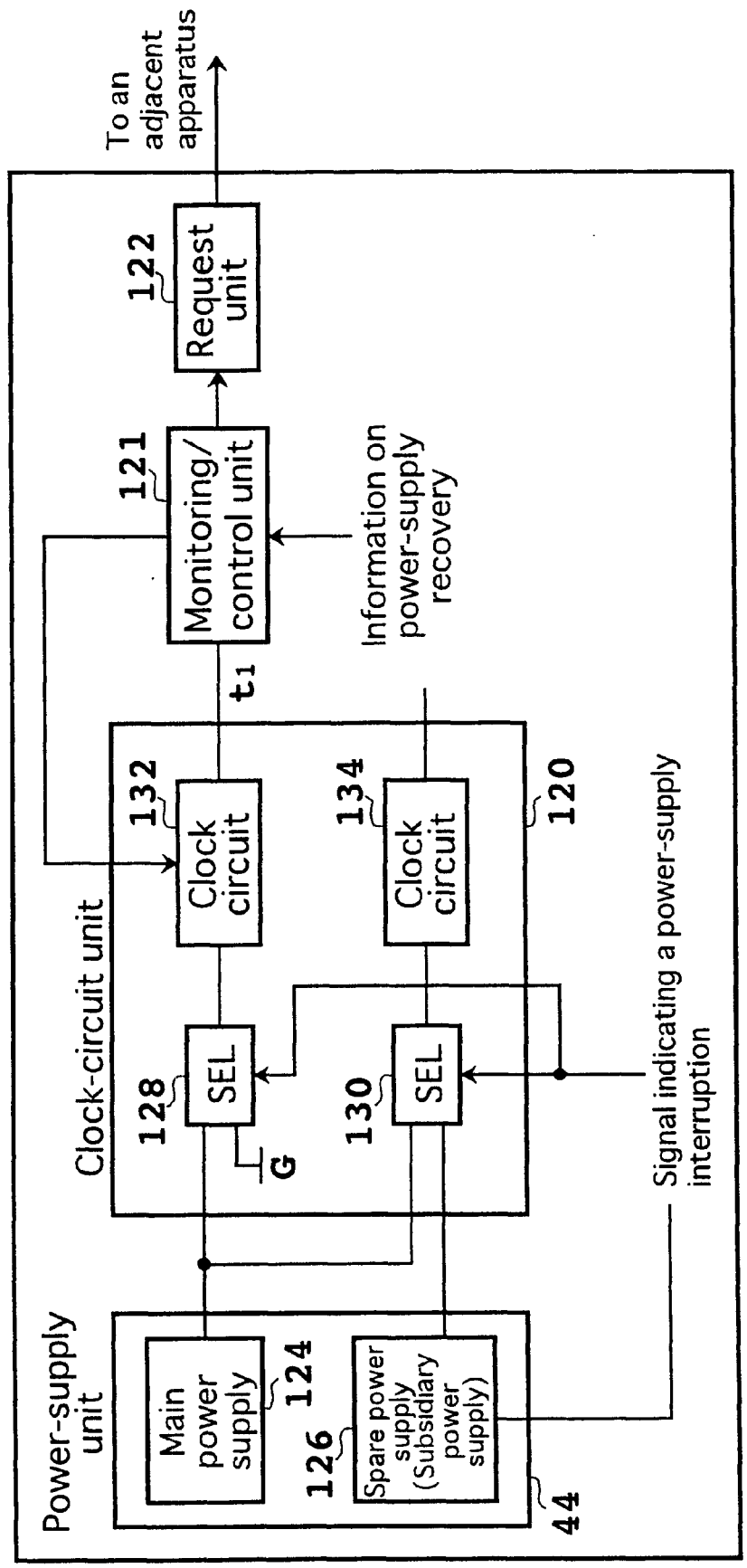

F I G. 2 2
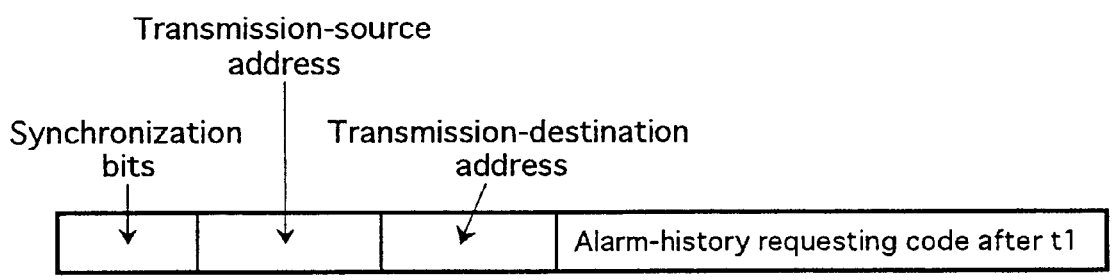

US 6,646,981 B1

TRANSMISSION APPARATUS AND COMMUNICATION NETWORK CAPABLE OF DETECTING A PERIOD OF TIME WITH A LINE AFFECTED DUE TO A FAILURE OF A POWER SUPPLY

BACKGROUND OF THE INVENTION

1. Field of the Invention

In general, the present invention relates to a transmission apparatus and a communication network. More particularly, the present invention relates to detection of a period of time with a transmission line affected due to a failure of a power supply occurring in a transmission apparatus. A period of time with a transmission line affected is a period of time during which a line transmission is affected by a failure of a power supply occurring in a transmission apparatus.

2. Description of the Related Art

When a failure of a power supply occurs in a transmission apparatus employed in a communication network, the transmission apparatus in which the failure of a power supply occurs becomes as a cause of disabled communication in another transmission apparatus communicating with the transmission apparatus including the failing power supply. It should be noted that another transmission apparatus communicating with the transmission apparatus including the failing power supply is also referred to hereafter as an adjacent transmission apparatus. As the power supply is recovered, however, the normal communication is also restored as well. A period of time during which the communication in the transmission apparatuses is not functional due to the failure of a power supply is reported by a center of the communication network to users. As described above, such a period of time is referred to as a period of time with a transmission line affected. In the conventional system, when a failure of a power supply occurs in a transmission apparatus, the fact that an adjacent transmission apparatus becomes incapable of receiving a signal from the failing transmission apparatus is detected by an alarm unit which then transmits alarm information to a monitor/control unit. Then, the alarm information is recorded in a history recording unit. Subsequently, the alarm unit reports the alarm information to a center through a monitoring LAN. The center carries out activities such as general tests, monitoring, restoration tests and line setting of the transmission apparatuses. As the failure of a power supply occurring in the transmission apparatus is fixed, pieces of alarm information collected by the center from transmission apparatuses adjacent to the failing transmission apparatus are output to a printer to indicate how long communication lines have been affected by the failure of a power supply. A person in charge of system maintenance and system supervision then visually examines the pieces of alarm information one piece after another to asses the effects of the failure of the power supply.

However, the conventional transmission apparatus has the following problems.

(1) When a failure of a power supply occurs in a transmission apparatus, each communication line connected to the apparatus is affected till the failure is fixed and the apparatus is restored to a normal state. In a multi-vendor environment involving several vendors supplying software and hardware as well as several vendors doing communication businesses, it is quite within the bounds of possibility that alarm information varies from vendor to vendor. It is thus necessary for the person in charge of maintenance to examine periods of time each with a transmission line affected due to a failure of a power supply occurring in a transmission apparatus one time after another by taking differences in alarm information between vendors into consideration. Such examination requires a long time and it is thus difficult to present a period of time with a transmission line affected to users immediately. In addition, a large-scale communication network normally has a hierarchical structure wherein a plurality of transmission apparatuses connected to a transmission apparatus with,a failing power supply may be centrally monitored by different centers. In this case, each of the centers detects a period of time with a transmission line affected by the transmission apparatus in which the failure of a power supply has occurred. In order to grasp the whole picture of the state, however, it is necessary to collect all periods of time each with a transmission line affected which are detected by a plurality of centers and it thus takes an even longer time to collect such pieces of information. In addition, the person in charge of maintenance has to identify all transmission apparatuses adjacent to the transmission apparatus in which the failure of a power supply has occurred and detect periods of time each with a transmission line affected from pieces of alarm information received from the adjacent transmission apparatuses in order to examine the periods of time each with a transmission line affected. Due to the fact that each of the centers control s a large number of transmission apparatuses, however, it is difficult to manually and in a short time form a judgment as to which transmission apparatuses are involved in communications with the transmission apparatus in which the failure of a power supply has occurred, and the formation of such a judgment thus entails a number of people in charge of maintenance and a long time.

(2) When the failure of a power supply is fixed, the transmission apparatus in which the failure of a power supply has occurred informs a center that the power supply has been recovered and transfers data such as line-setting information from a non-volatile backup memory of the transmission apparatus to a volatile memory of the apparatus to set the state prior to the occurrence of the failure of a power supply before resuming communication. At that time, a secondary failure may occur because of some reasons so that complete line setting becomes impossible. For example, the loading (the transfer) of line-setting information from the non-volatile backup memory to the volatile memory ends in a failure for some lines. In this case, nevertheless, the transmission apparatus in which a failure of a power supply has occurred appears to the center to have been restored to the normal operation by the recovery of the power supply of the transmission apparatus. In actuality, however, an adjacent transmission apparatus connected to a line of which can not be set normally, is still in a state of being incapable of receiving a signal as before. As a result, the adjacent transmission apparatus continues transmitting alarm information to the center. At that time, the person in charge of maintenance needs to identify and fix the secondary failure on the basis of the alarm information. Since the transmission apparatus with the recovered power supply itself does not transmit alarm information, however, it may take time to identify the secondary failure. In addition, in case the power-supply of a transmission apparatus is interrupted during line setting of the transmission apparatus by a center, line-setting information to be transmitted from the center to transmission apparatuses is not reflected in the failing transmission apparatus, but is reflected in the adjacent transmission apparatus. On the other hand, when a transmission apparatus in which a failure of the power supply has occurred resets the connecting lines after the power supply is recovered, no signal is transmitted to an adjacent transmission apparatus, a transmission line of which remains to be set. As a result, the adjacent transmission apparatus is left in a state of being incapable of receiving signals. It is thus naturally desirable to improve the method of recovering the communication network through reduction of the time loss incurred in the recovery by letting the center naturally see alarm information received from a transmission apparatus in which a secondary failure of a power supply has occurred, causing the transmission apparatus incapable of normally setting lines.

SUMMARY OF THE INVENTION

It is thus an object of the present invention to provide a transmission apparatus and a communication network that are capable of detecting periods of time each with a transmission line affected in a short time.

It is another object of the present invention to provide a transmission apparatus and a communication network that are capable of fixing a secondary failure in a short period of time even if the secondary failure occurs in a transmission apparatus with its power supply recovered.

In accordance with an aspect of the present invention, there is provided a transmission apparatus characterized in that the apparatus comprises:

a power-supply unit;

first detection means for detecting a power-supply recovery of the power-supply unit;

request means which is used for transmitting a demanding command to an adjacent transmission apparatus completing line setting based on line-setting information to request the adjacent apparatus to transmit alarm information when the first detection means detects a power-supply recovery, wherein the alarm information includes a disabled-reception time and a recovered-reception time, that is, times at which reception of signals from the transmission apparatus is disabled and recovered respectively;

first reception means for receiving the alarm information from the adjacent transmission apparatus; and second detection means for detecting a period of time with a transmission line affected between a disabled-reception time and a recovered-reception time of the adjacent transmission apparatus based on the alarm information received by the first reception means.

It is desirable to again transmit the demanding command to the adjacent transmission apparatus which has been subjected to the line setting based on the line-setting information after again carrying out the line setting of the adjacent transmission apparatus in case the alarm information received earlier indicates that the reception of the adjacent transmission apparatus has not been recovered yet. It is further desirable to provide the transmission apparatus with:

third detection means for detecting whether or not communication with the adjacent transmission apparatus which has been subjected to the line setting based on the line-setting information is possible;

recording means for recording alarm information based on a result of detection produced by the third detection means into a history file wherein the alarm information includes times at which reception of a signal from the adjacent transmission apparatus is disabled and recovered;

second reception means for receiving an incoming demanding command from an adjacent transmission apparatus which has been subjected to the line setting based on the line-setting information; and transmission means for obtaining pieces of alarm information for the adjacent transmission apparatus transmitting the incoming demanding command from the history file and transmitting the pieces of alarm information to the adjacent transmission apparatus transmitting the incoming demanding command in response to the incoming demanding command.

According to the configurations described above, the request means transmits a demanding command to an adjacent transmission apparatus completing line setting based on line-setting information to request the adjacent apparatus to transmit alarm information when the first detection means detects a power-supply recovery. The second reception means of the adjacent transmission apparatus receives the demanding command. The transmission means of the adjacent transmission apparatus obtains alarm information for the transmission apparatus transmitting the demanding command and transmits the alarm information to the transmission apparatus transmitting the demanding command. The first reception means of the failing transmission apparatus receives alarm information. The second detection means of the failing transmission apparatus detects a period of time with a transmission line affected from the alarm information. The period of time with a transmission line affected is then transmitted typically to a center. In this way, a period of time with a transmission line affected can be detected in a short time. In addition, in the event of a secondary failure, a demanding command is retransmitted after again carrying out the line setting based on the line-setting information. As a result, an automatic recovery is possible even if a secondary failure occurs.

In accordance with another aspect of the present invention, there is provided a communication network comprising a center and a plurality of transmission apparatuses each connected to the center by a communication line, the communication network characterized in that:

each of the transmission apparatuses comprises:

a power-supply unit;

first detection means for detecting a power-supply recovery of the power-supply unit;

request means which is used for transmitting a demanding command to an adjacent transmission apparatus completing line setting based on line-setting information to request the adjacent apparatus to transmit alarm information related to the transmission apparatus transmitting the demanding command, when the first detection means detects a power-supply recovery, wherein the alarm information includes a disabled-reception time and a recovered-reception time, that is, times at which reception of signals from the transmission apparatus is disabled and recovered respectively;

first reception means for receiving the alarm information from the adjacent transmission apparatus;

second detection means for detecting a period of time with a transmission line affected between a disabled-reception time and a recovered-reception time of the adjacent transmission apparatus included in the alarm information received by the first reception means;

transmission means which is used for transmitting the periods of time each with a transmission line affected to the center when all of the alarm information indicating that all adjacent transmission apparatuses have recovered is received; and second reception means for receiving line-setting information from the center, whereas the center comprises:

recording means for recording line-setting information for the transmission apparatuses; and second transmission means for transmitting the line-setting information to the transmission apparatus transmitting the periods of time each with a transmission line affected if the periods of time each with a transmission line affected for all adjacent transmission lines completing line setting based on the line-setting information recorded by the recording means have not been detected.

According to the configurations described above, a transmission apparatus in which a failure has occurred detects a period of time with a transmission line affected of each adjacent transmission apparatus as is the case with the one described above. When the reception capabilities of all the adjacent transmission apparatuses are recovered, allowing periods of time each with a transmission line affected to be detected, the periods of time each with a transmission line affected are reported to the center. If the center has not received a period of time with a transmission line affected of a transmission apparatus which is adjacent to the transmission apparatus experiencing a failure of a power supply and supposed to have undergone line setting based on line-setting information stored in the center, the center transmits the line-setting information to the transmission apparatus occurring the failure of a power supply. The transmission apparatus occurring a failure of a power supply again carries out line setting based on the line-setting information received from the center. In this way, an automatic recovery is possible even if a power-supply occurs during line setting.

The above and other objects, features and advantages of the present invention as well as the manner of realizing them will become more apparently and the invention itself will be best understood from a study of the following description and appended claims with reference to the attached drawings showing some preferred embodiments of the invention.

BRIEF DESCRIPTION OF THE DRAWINGS

FIG. 21 is a block diagram showing a clock-circuit unit employed in the transmission apparatus shown in FIG. 20; and FIG. 22 is a diagram showing a typical format of a demanding command.

DESCRIPTION OF THE PREFERRED EMBODIMENTS

Figure 1:
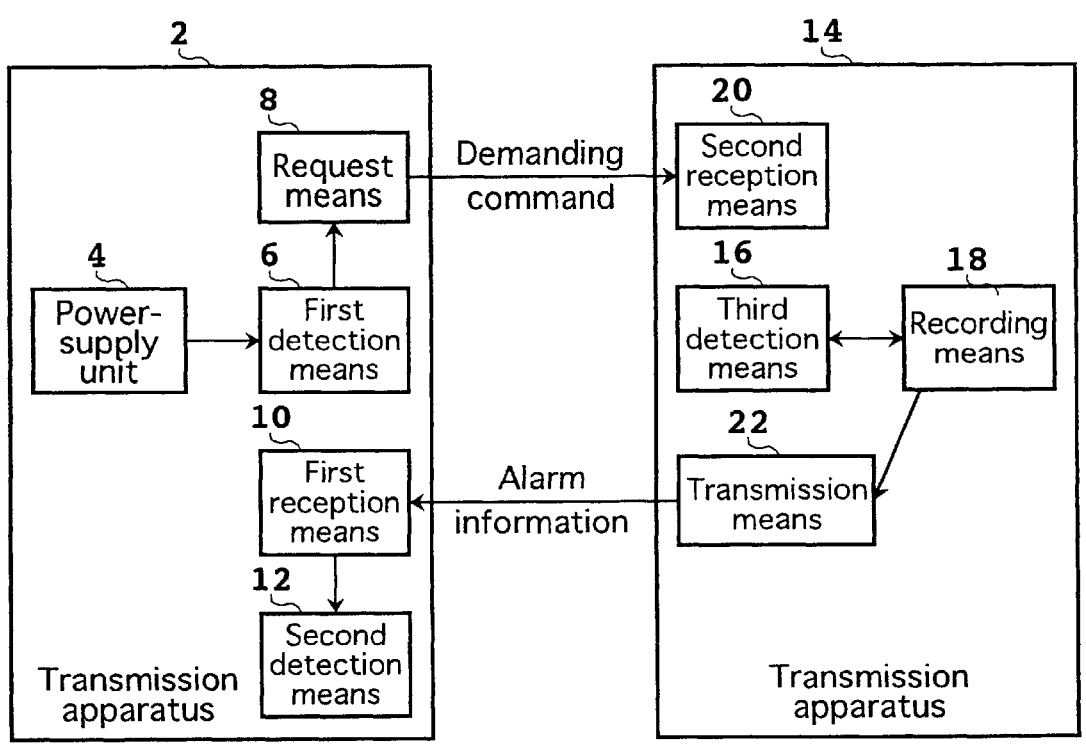
FIG. 1 is a block diagram showing the principle underlying the present invention.

Before describing the embodiments of the present invention, its principle is explained by referring to FIG. 1. FIG. 1 is a block diagram showing the principle underlying a transmission apparatus 2 provided by the present invention. As shown in the figure, the transmission apparatus 2 comprises a power-supply unit 4, first detection means 6, request means 8, first reception means 10 and second detection means 12. A transmission apparatus 14 adjacent to the transmission apparatus 2 comprises third detection means 16, recording means 18, second reception means 20 and transmission means 22. The transmission apparatus 2 is a failing transmission apparatus in which failure caused by a power-supply interruption occurs in the power-supply unit 4. The power-supply unit 4 is later recovered from the failure caused by the power-supply interruption. The first detection means 6 detects the recovery of the power-supply unit 4 and informs the request means 8 that the power-supply unit 4 has been recovered.

The request means 8 identifies the adjacent transmission apparatus 14 with a transmission line thereof set from line-setting information and transmits a demanding command to the adjacent transmission apparatus 14 to request the adjacent transmission apparatus 14 that alarm information related to the transmission apparatus 2 be transmitted to the transmission apparatus 2. The third detection means 16 contained in the adjacent transmission apparatus 14 is monitoring a main signal transmitted by the transmission apparatus 2 to form a judgment as to whether or not the main signal can be received. When the main signal can no longer be received, the recording means 18 records alarm information indicating suspended reception of a signal from the transmission apparatus 2 and a disabled-reception time, that is, a time at which the alarm information is generated, in a history file. As the reception of a signal from the transmission apparatus 2 is recovered, the recording means 18 records alarm information indicating the recovered reception and a recovered-reception time, that is, a time at which the alarm information is generated, in the history file. The second reception means 20 contained in the adjacent transmission apparatus 14 receives the demanding command from the transmission apparatus 2. The transmission means 22 employed in the adjacent transmission apparatus 14 acquires alarm information related to the transmission apparatus 2 from the history file and transmits the information to the apparatus 2. The first reception means 10 employed in the transmission apparatus 2 receives the alarm information. The second detection means 12 contained in the transmission apparatus 2 detects a period of time with a transmission line affected between a disabled-reception time and a recovered reception time included in the alarm information acquired from the history file by the adjacent transmission apparatus 14 and transmitted to the first reception means 10.

Such a period of time with a transmission line affected is detected for every adjacent transmission apparatus. Periods of time each with a transmission line affected which are detected in this way are transmitted to a center by way of typically a LAN (Local Area Network). The periods of time each with a transmission line affected transmitted to the center are output to a printer or the like to be reported to users by a person in charge of maintenance. In this way, periods of time each with a transmission line affected can be detected in a short time.

First Embodiment

Figure 2:
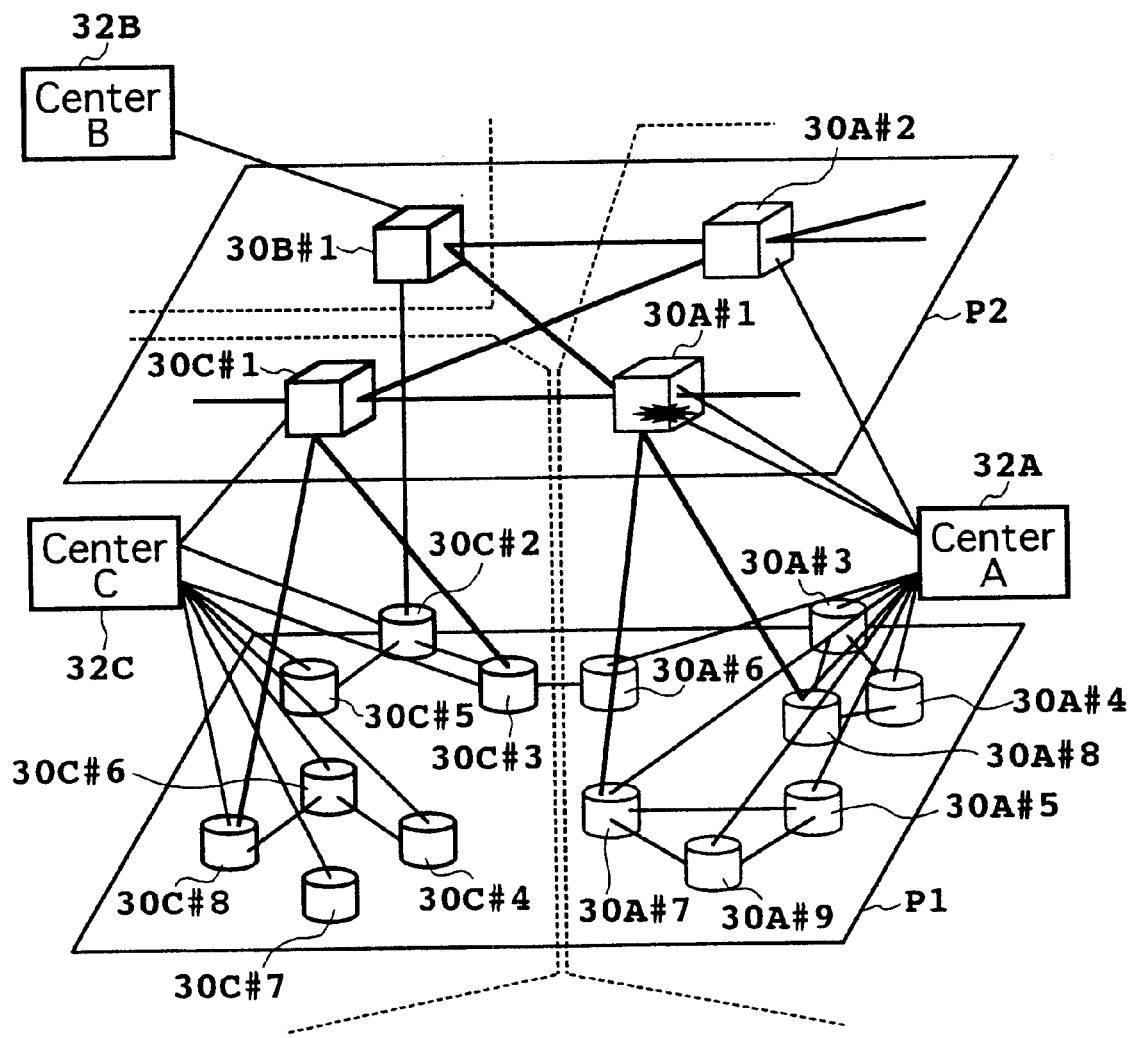
FIG. 2 is a diagram showing the configuration of a communication network implemented by an embodiment of the present invention.

FIG. 2 is a diagram showing the configuration of a communication network implemented by an embodiment of the present invention. The communication network shown in FIG. 2 is typically an SDH (Synchronous Digital Hierarchy) communication network. The communication network comprises a plurality of hierarchical layers each including transmission apparatuses which communicate with each other at the same transmission speed and are controlled by normally a plurality of centers. In the example shown in FIG. 2, transmission apparatuses on a plane P1 at the bottom hierarchical layer communicate with each other at a transmission speed of 1.5 Mbps and are controlled by a center 32A and a center 32C and transmission apparatuses on a plane P2 at the top hierarchical layer communicate with each other at a transmission speed of 600 Mbps and are controlled by a center 32B, the center 32C and the center 32A. The centers 32A, 32B and 32C each carry out line setting, restoration tests and monitoring control of a plurality of transmission apparatuses. For example, the center 32A controls the transmission apparatuses 30A #1 to 30A #9 and the center 32B control the transmission apparatus 30B #1. The center 32C controls the transmission apparatuses 30C #1 to 30C #8.

Figure 3:
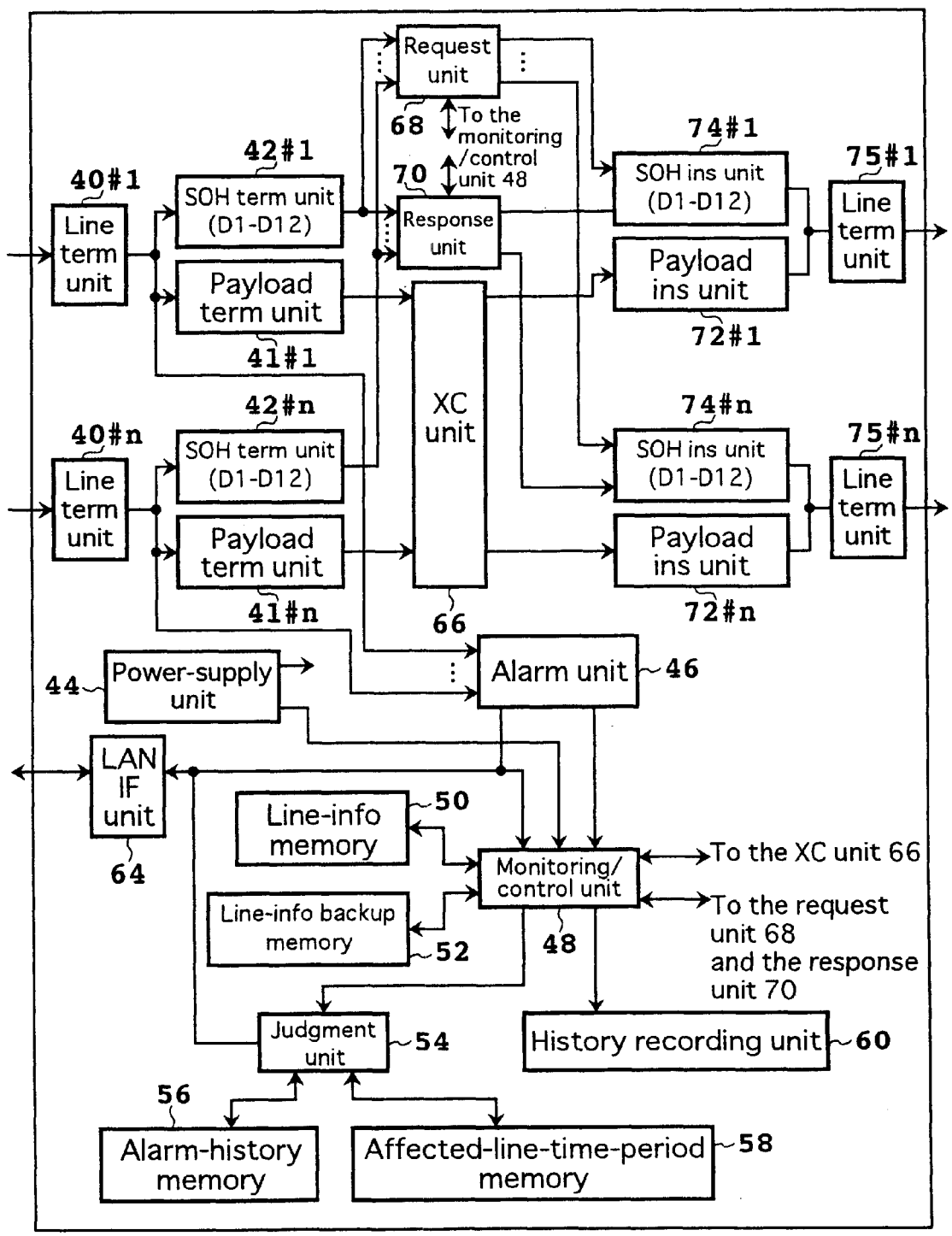
FIG. 3 is a diagram showing the configuration of a transmission apparatus implemented by a first embodiment of the present invention.

FIG. 3 is a diagram showing the configuration of a transmission apparatus implemented by a first embodiment of the present invention. The first embodiment shown in FIG. 3 is a general implementation of the transmission apparatuses 30A #1 to 30A #9, the transmission apparatus 30B #1 and the transmission apparatuses 30C #1 to 30C #8 shown in FIG. 2. In the following description, however, assume for example that the first embodiment particularly implements the transmission apparatus 30A #1 shown in FIG. 2. As shown in FIG. 3, the transmission apparatus 30A #1 comprises line termination units 40 #1 to 40 #n, payload-data termination units 41 #1 to 41 #n, SOH (section overhead) termination units 42 #1 to 42 #n, a power-supply unit 44, an alarm unit 46, a monitoring/control unit 48, a line-information memory 50, a line-information backup memory 52, a judgment unit 54, an alarm-history memory 56, an affected-line-time-period memory 58, a history recording unit 60, a LAN IF unit 64, a cross-connect (XC) unit 66, a request unit 68, a response unit 70, payload-data insertion units 72 #1 to 72 #n, SOH insertion units 74 #1 to 74 #n and line termination units 75 #1 to 75 #n.

The line termination units 40 #1 to 40 #n are each an interface circuit for receiving an SDH information signal from a transmission line such as an optical fiber connected to an adjacent transmission apparatus and converting the signal into an electrical signal to be processed in the transmission apparatus 30A #1 in case the signal is an optical signal. The payload-data termination units 41 #1 to 41 #n are each a circuit for extracting payload data from the SDH information signal and outputting the payload data to the XC unit 66. The SOH termination units 42 #1 to 42 #n are each a circuit for extracting a section overhead from the SDH information signal and outputting D1 to D12 of the section overhead to the request unit 68. The power-supply unit 44 supplies a power-supply voltage to each unit in the transmission apparatus 30A #1. The alarm unit 46 checks the SOH of the SDH information signal received from line termination unit 40 #i where i=1 to n to form a judgment as to whether or not reception of a main signal from an adjacent transmission apparatus connected to the line termination unit 40 #i is possible. If reception of a main signal from the adjacent transmission apparatus is found impossible, the alarm unit 46 informs the monitoring/control unit 48 of the fact that reception of a main signal from the adjacent transmission apparatus has become impossible. In addition, the alarm unit 46 transmits a main signal number or a port number of the line termination unit 40 #i through which reception is disabled and alarm information indicating the disabled reception to the center 32A by way of the LAN IF unit 64. Likewise, when the reception of the main signal by the line termination unit 40 #i is recovered, the alarm unit 46 informs the monitoring/control unit 48 of the fact that the reception of the main signal has been recovered. By the same token, the alarm unit 46 transmits the main signal number or the port number of the line termination unit 40 #i through which reception has been recovered and alarm information indicating the recovered reception to the center 32A by way of the LAN IF unit 64.

The monitoring/control unit 48 has the following functions:

1. The monitoring/control unit 48 checks the voltage of the power-supply unit 44 to detect a recovery. When the power-supply unit 44 is recovered, the monitoring/control unit 48 transfers line-setting information stored in the line-information backup memory 52 as backup information to the line-information memory 50 and carries out line setting. Then, the monitoring/control unit 48 acquires the port number of the line termination unit 75 #i experiencing the line setting based on the line-setting information and the apparatus number of an adjacent transmission apparatus connected to the line termination unit 75 #i from the line-setting information, and gives an instruction to the request unit 68 to transmit a demanding command to the adjacent transmission apparatus connected to the line termination unit 75 #i indicated by the port number.

2. When alarm information indicating disabled or recovered reception of a line termination unit 40 #i is received from the alarm unit 46, the monitoring/control unit 48 records the alarm information, the apparatus number of an adjacent transmission apparatus connected to the line termination unit 40 #i and an alarm-generation time, that is, a time at which the alarm information is generated, in the history recording unit 60.

3. The monitoring/control unit 48 controls cross connection carried out by the XC unit 66 in accordance with the line-setting information loaded into the line-information memory 50.

4. When the response unit 70 notifies the monitoring/control unit 48 where a demanding command has been received, the monitoring/control unit 48 reads out alarm information including an apparatus number, information indicating disabled or recovered reception and alarm-generation time for an adjacent transmission apparatus issuing the demanding command from the history recording unit 60 and supplies the alarm information to the response unit 70.

5. When the request unit 68 notifies the monitoring/control unit 48 where alarm information has been received, the monitoring/control unit 48 gives an instruction to the judgment unit 54 to detect a period of time with a transmission line affected from the alarm information.

6. When the judgment unit 54 notifies the monitoring/control unit 48 of a judgment result indicating that reception by an adjacent transmission apparatus has not been recovered yet, the monitoring/control unit 48 determines that a secondary failure has occurred while line-setting information is being read out from the line-information backup memory 52. In this case, when the secondary failure is fixed, the monitoring/control unit 48 transfers line-setting information from the line-information backup memory 52 to the line-information memory 50 and again carries out line setting before giving an instruction to the request unit 68 to transmit a demanding command to the adjacent transmission apparatus.

7. When notified by the center 32A that reception in any of the adjacent transmission apparatuses has not been recovered, the monitoring/control unit 48 receives line-setting information from the center 32A, stores it in the line-information backup memory 52 and again carries out line setting based on the line-setting information before giving an instruction to the request unit 68 to acquire alarm information from an adjacent transmission apparatus completing the line setting.

The above function is provided to cope with the following problem. Assume that, in an adjacent transmission apparatus, setting of a newly added line has been done normally. In an transmission apparatus 30A, however, a failure of a power supply occurs during the setting of the newly added line, making the setting of the newly added line impossible. As a result, reception in the adjacent transmission apparatus remains disabled as it is. In this case, since the failing transmission apparatus 30A does not transmit a demanding command to the adjacent transmission apparatus for which line setting is not carried out, in some cases, it may appear to the failing transmission apparatus 30A that reception in all adjacent transmission apparatuses completing line setting based on line-setting information appears to have been recovered and that all the adjacent transmission apparatuses have each completed a build-up process normally. It is thus necessary to repeat line setting for adjacent transmission apparatuses for which line setting is not carried out by down loading line-setting information from the center 32A to the transmission apparatus 30A.

The line-information memory 50 is a volatile memory implemented typically by a RAM to which line-setting information stored in the line-information backup memory 52 is loaded. On the other hand, the line-information backup memory 52 is a magnetic disc for saving line-setting information. The judgment unit 54 extracts a most recent disabled-reception time and a recovered-reception time following the most recent disabled-reception time from alarm information input from the monitoring/control unit 48, storing the information of the disabled-reception and recovered-reception times into the alarm-history memory 56. The judgment unit 54 calculates a period of time with a transmission line affected from the alarm information stored in the alarm-history memory 56, storing the period of time with a transmission line affected into the affected-line-time-period memory 58 for each transmission apparatus. The judgment unit 54 notifies the monitoring/control unit 48 of whether or not reception in each transmission apparatus has been recovered. The judgment unit 54 transmits the period of time with a transmission line affected for each transmission apparatus to the center 32A upon a request made by the monitoring/control unit 48.

In the alarm-history memory 56, a disabled-reception time and a recovered-reception time for each adjacent transmission apparatus are recorded along with the apparatus number of each of the adjacent transmission apparatus. In the affected-line-time-period memory 58, a period of time with a transmission line affected is recorded for each adjacent transmission apparatus. The history recording unit 60 is a file used for recording alarm information including an apparatus number, a description of an alarm and a time at which the alarm is generated for each adjacent transmission apparatus. The LAN IF unit 64 serves as an interface with a LAN. The XC unit 66 cross-connects payload data input from the payload termination unit 41 #i to the respective payload data insertion unit 72 #i in accordance with a command issued by the monitoring/control unit 48. The request unit 68 outputs a demanding command to be described later to the SOH insertion unit 74 #i specified by a port number in accordance with a command issued by the monitoring/control unit 48. In addition, D1 to D12 received from the SOH termination unit 42 #i are checked to determine whether or not they are alarm information (alarm history data) from an adjacent transmission apparatus. If they are alarm-history data, the alarm-history data is passed on to the monitoring/control unit 48 along with the apparatus number of the adjacent transmission apparatus serving as a transmission source.

Figure 4:
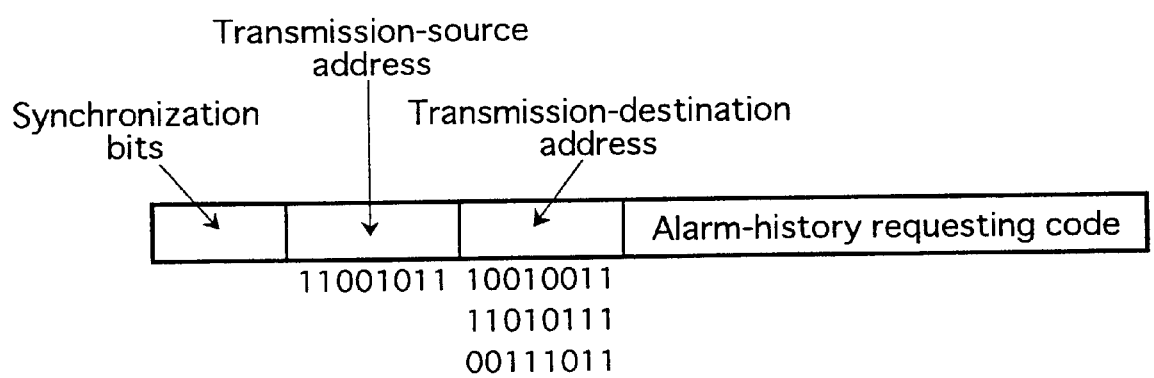
FIG. 4 is a diagram showing a typical format of a demanding command.

FIG. 4 is a diagram showing a typical transmission format of a demanding command. As shown in the figure, a demanding command comprises synchronization bits, the address of the transmission source, the address of the transmission destination and an alarm-history requesting code. The synchronization bits form a specific bit pattern for establishing synchronization with received data. The address of the transmission source is the apparatus number of a transmission apparatus serving as the transmission source. On the other hand, the address of the transmission destination is the apparatus number of a transmission apparatus serving as the transmission destination. The alarm-history requesting code is code with a fixed length indicating that the command requests an alarm history. The response unit 70 checks D1 to D12 received from the SOH termination unit 42 #i to determine whether or not they are a demanding command from an adjacent transmission apparatus. If they are a demanding command, the monitoring/control unit 48 is informed of the fact that a demanding command has been received and the apparatus number of the transmission apparatus serving as a transmission source. In addition, when an instruction to transmit alarm-history data is received from the monitoring/control unit 48, the alarm-history data and the port number of a transmission apparatus serving as a transmission destination are output to the SOH insertion unit 74 #i corresponding to the port number.

Figure 5:
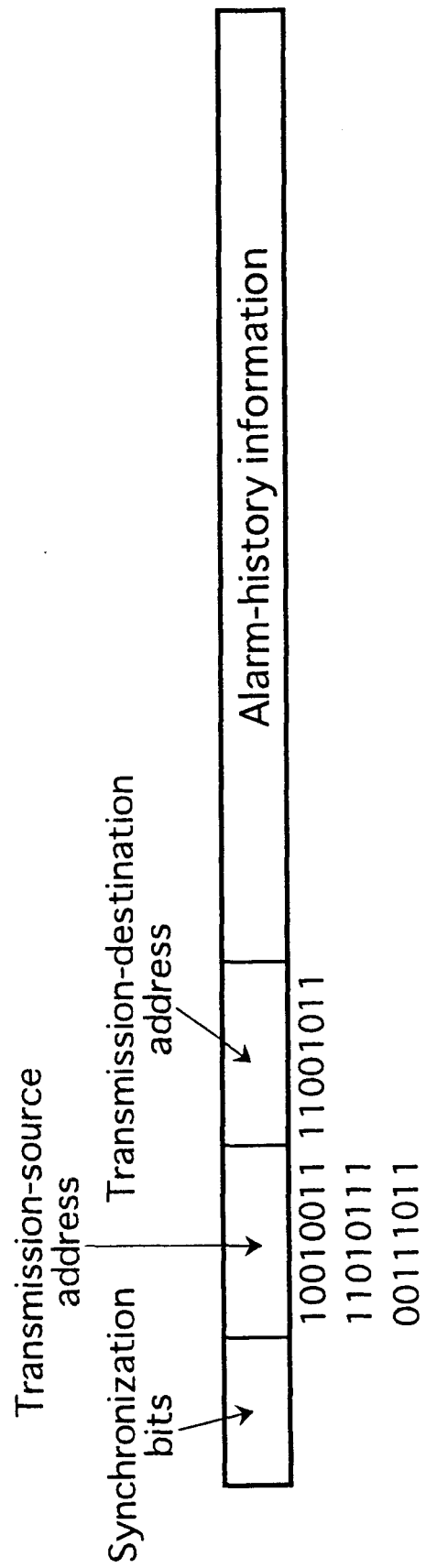
FIG. 5 is a diagram showing a typical format of alarm-history data.
Figure 6:
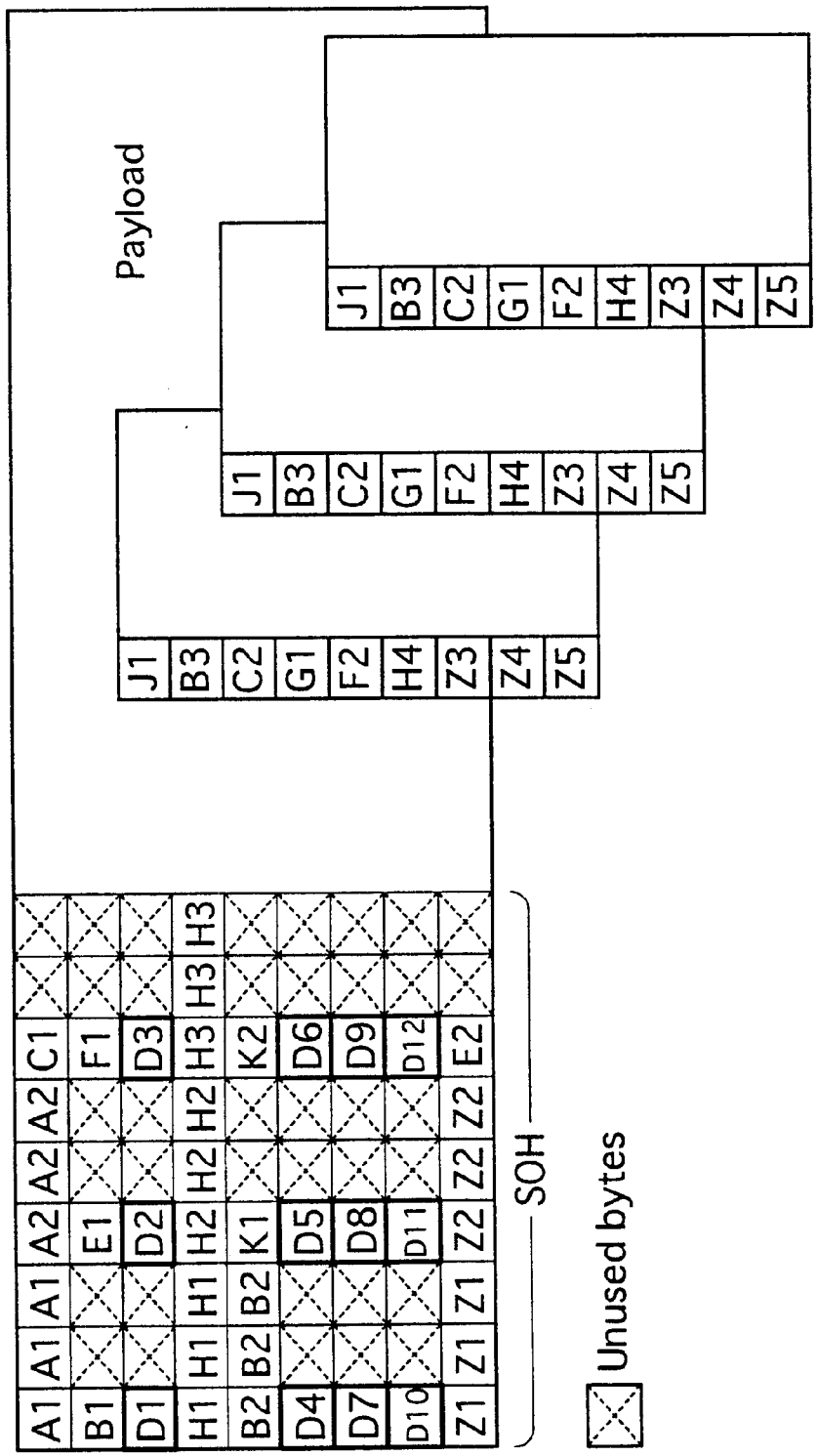
FIG. 6 is a diagram showing a typical structure of an STM-1 (156 Mb/s) frame.

FIG. 5 is a diagram showing a typical transmission format of alarm-history data. As shown in the figure, the alarm-history data comprises synchronization bits, the address of the transmission source, the address of the transmission destination and alarm-history information. The synchronization bits, the address of the transmission source and the address of the transmission destination are the same as those of a demanding command. The alarm-history information includes alarm-generation times and alarm information in addition to information such as a disabled-reception or recovered-reception state and a degradation level of an optical signal. It should be noted that alarm-history data may be transmitted by putting it in a frame having a fixed length. It is necessary to split alarm-history data into a plurality of fixed-length frames in case the data can not be accommodated in 1 frame. In this case, a bit is inserted into each frame to indicate whether the frame is followed by a next frame or a last one. In this embodiment, the contents of a demanding command or alarm-history data excluding the synchronization bits are transmitted by typically inserting the contents into fields D1 to D12 of an SOH of an STM-1 frame. It should be noted that the synchronization bits are transmitted by inserting the bits into the A1 and A2 fields of an STS-1 frame. FIG. 6 is a diagram showing a typical structure of an STM-1 frame (156 Mb/s). As shown in the figure, an STM-1 frame comprises an SOH and a payload. The SOH comprises a relay section overhead and a multiplexed section overhead. The relay section overhead comprises A1 and A2 fields which are used for frame synchronization, C1 (an identification number of STM-1 in STM-N), B1 (error monitoring of the relay section), E1 (audio arrangement of the relay section), F1 (failure identification of the relay section) and D1 to D3 (data communication of the relay section).

On the other hand, the multiplexed section overhead comprises B2 (error monitoring of sections), K1 (control of a switching system), K2 (transfer of a multiplexed section state), D4 to D12 (data communication of the multiplexed section), Z1 (multiplexing prediction), Z2 (multiplexing error state notice) and E2 (audio arrangement of the multiplexing section). D1 to D12 in the SOH are used because they match with the purpose of transmitting the contents of a demanding command or alarm-history data. It should be noted that other fields can of course be used.

The payload insertion unit 72 #i inserts payload data output by the XC unit 66 into the payload of an SDH signal which is then supplied to the line termination unit 75 #i. Receiving an instruction from the request unit 68, the SOH insertion unit 74 #i inserts a demanding command into D1 to D12 of the SOH which is then output to the line termination unit 75 #i. In addition, receiving a command from the response unit 70, the SOH insertion unit 74 #i inserts alarm-history data into D3 to D12 of the SOH which is then output to the line termination unit 75 #i. The line termination unit 75 #i converts an STM-1 frame received from the SOH insertion unit 74# i and the payload-data insertion unit 72 #i into data with a format suitable for an external interface. Typically, the STM-1 frame is subjected to electro/optical conversion before being output to a transmission line such as an optical fiber.

Figure 7:
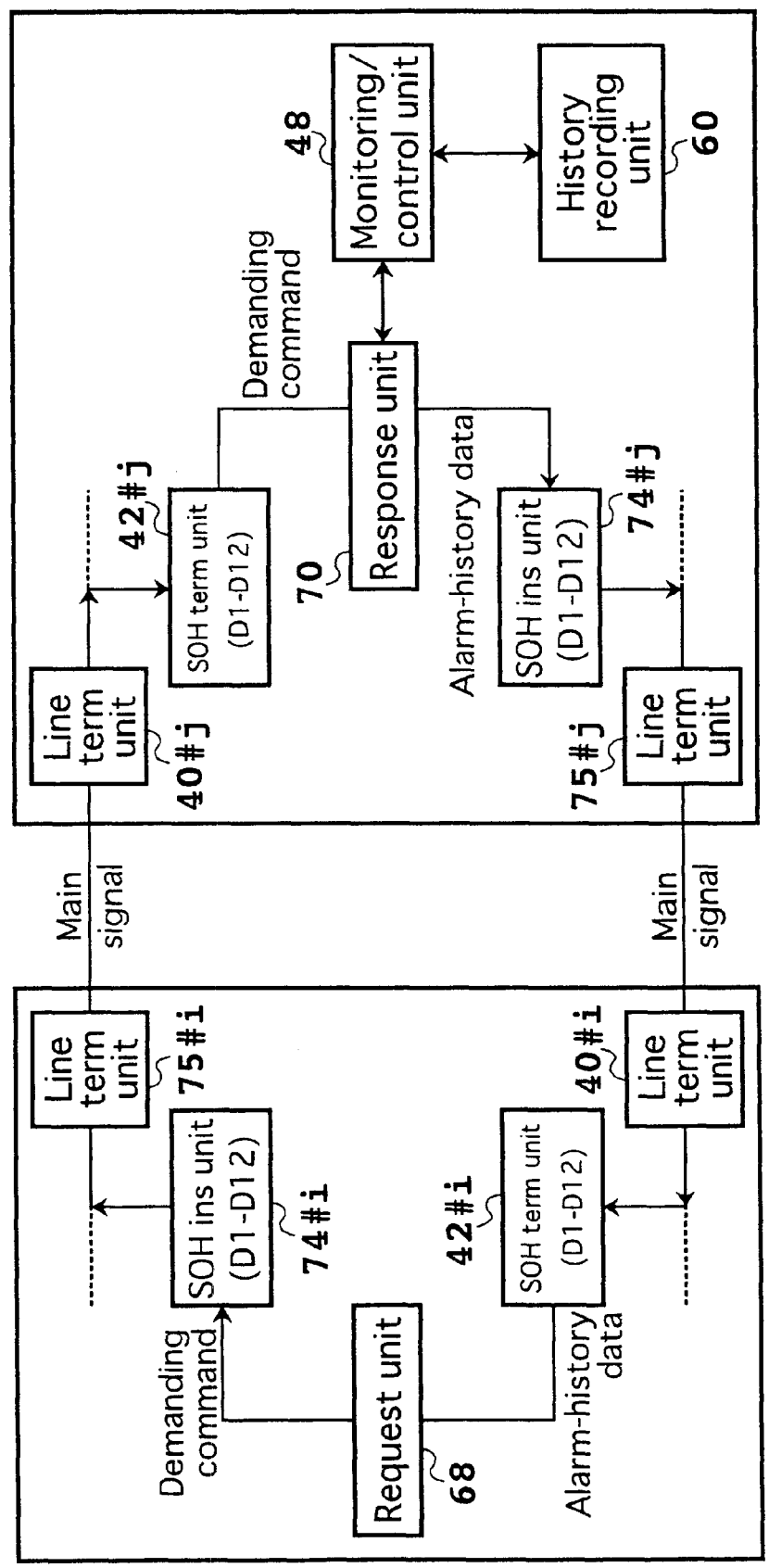
FIG. 7 is a diagram showing the operation of the transmission apparatus shown in FIG. 3.
Figure 12:
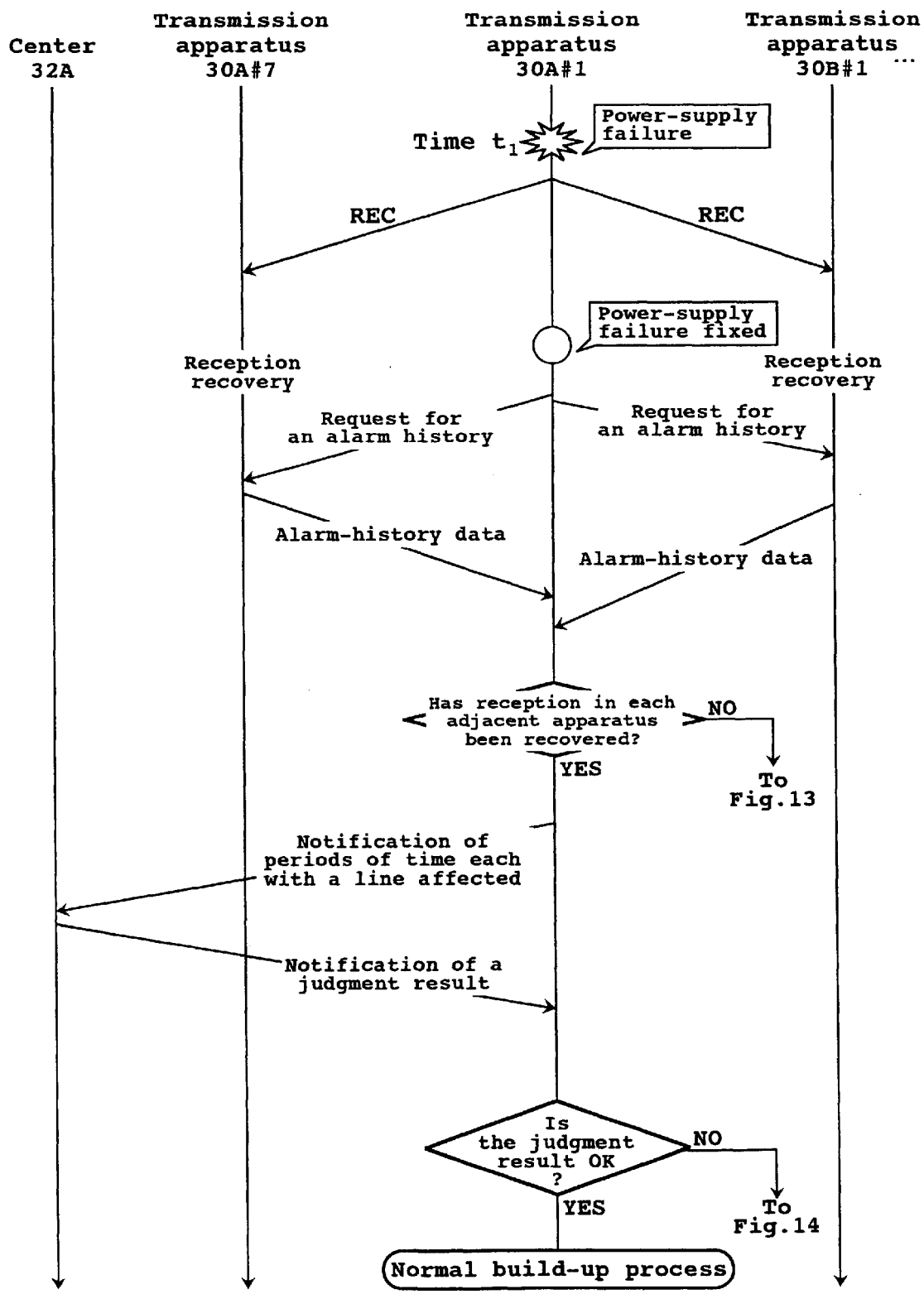
FIG. 12 shows a sequence chart representing the same alarm-history gathering processing.
Figure 13:
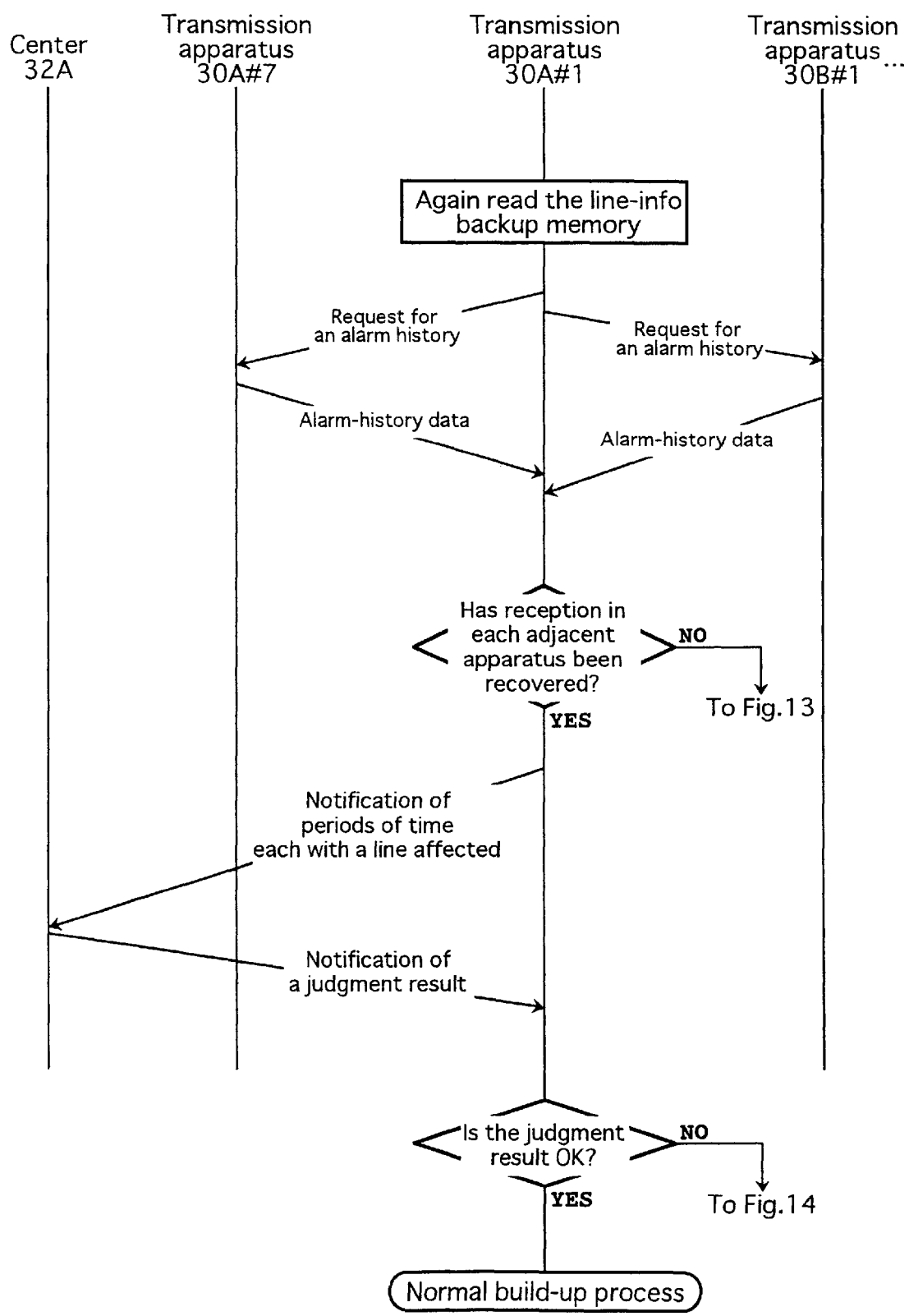
FIG. 13 shows a continuation of the sequence chart representing the alarm-history gathering processing.
Figure 14:
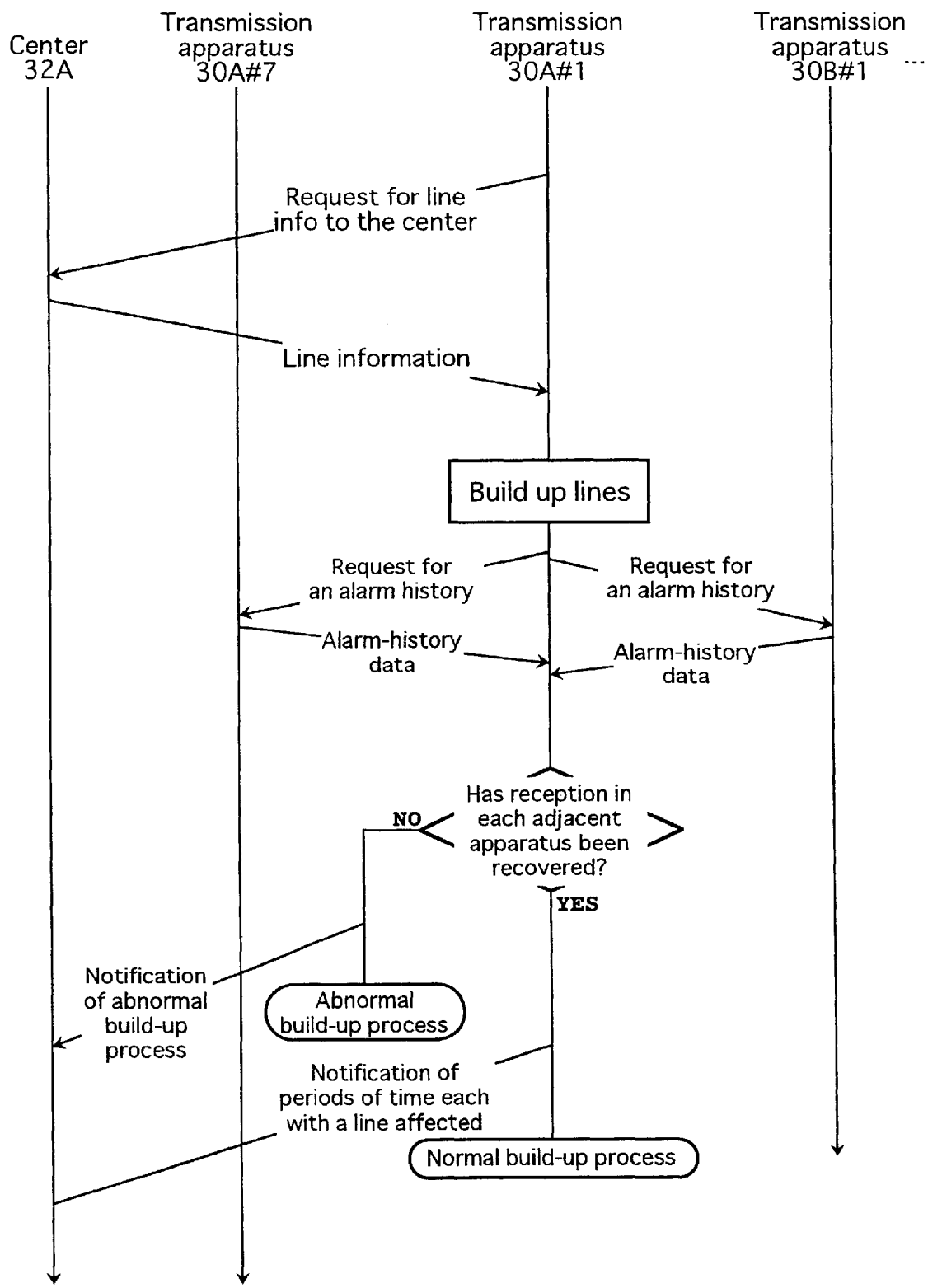
FIG. 14 shows another continuation of the sequence chart representing alarm-history gathering processing.

The operation of the transmission apparatus shown in FIG. 3 is explained as follows. While the transmission apparatus can serve as any of the transmission apparatuses employed in the communication network shown in FIG. 2, in the following description of the operation thereof, however, the transmission apparatus 30A #1 is taken as an example. FIG. 7 is a diagram showing the operation carried out by the transmission apparatus shown in FIG. 3 to transmit and receive a demanding command and alarm-history data. FIGS. 8 to 11 show a flowchart representing alarm-history gathering processing and FIGS. 12 to 14 show a sequence chart representing the same alarm-history gathering processing. At a step S2 of the flowchart shown in FIG. 8, a failure of the power-supply unit 44 employed in the transmission apparatus 30A #1 occurs, putting the supply of electric power in an interrupted state. As shown in FIG. 12, the alarm unit 46 of each of the adjacent transmission apparatuses 30A #5, 30A #7, 30B #1 and 30C #1 detects a state of disabled reception (REC) of a main signal revealed by the line termination unit 40 #j connected to the transmission apparatus 30A #i, informing the monitoring/control unit 48 that the line termination unit 40 #j is incapable of receiving a main signal. The alarm unit 46 then transmits alarm information indicating disabled reception along with the apparatus number of its own adjacent transmission apparatus and the input-port number of the line termination unit 40 #j to the centers 32A and 32B by way of the LAN IF unit 64.

In each of the adjacent transmission apparatuses 30A #5, 30A #7, 30B #1 and 30C #1, when the monitoring/control unit 48 receives alarm information indicating disabled reception from the alarm unit 46, the monitoring/control unit 48 records the apparatus number of the transmission apparatus 30A #1 which corresponds to the input-port number of the line termination unit 40 #j and an alarm-generation time into the history recording unit 60. Also in the transmission apparatus 30A #1 in which a failure has occurred in the power-supply unit 44 thereof, the alarm unit 46 transmits alarm information indicating the failure of the power-supply unit 44 along with the apparatus number of this failing transmission apparatus 30A #1 to the center 32A by way of the LAN IF unit 64 if the transmission apparatus 30A #1 is still capable of reporting the failure of the power-supply unit 44 to the center 32A. A person in charge of maintenance identifies the transmission apparatus 30A #1 in which a failure of the power-supply unit 44 has occurred from the pieces of alarm information reported to the centers 32A and 32B, and then fixes the failure of the power-supply unit 44.

Figure 8:
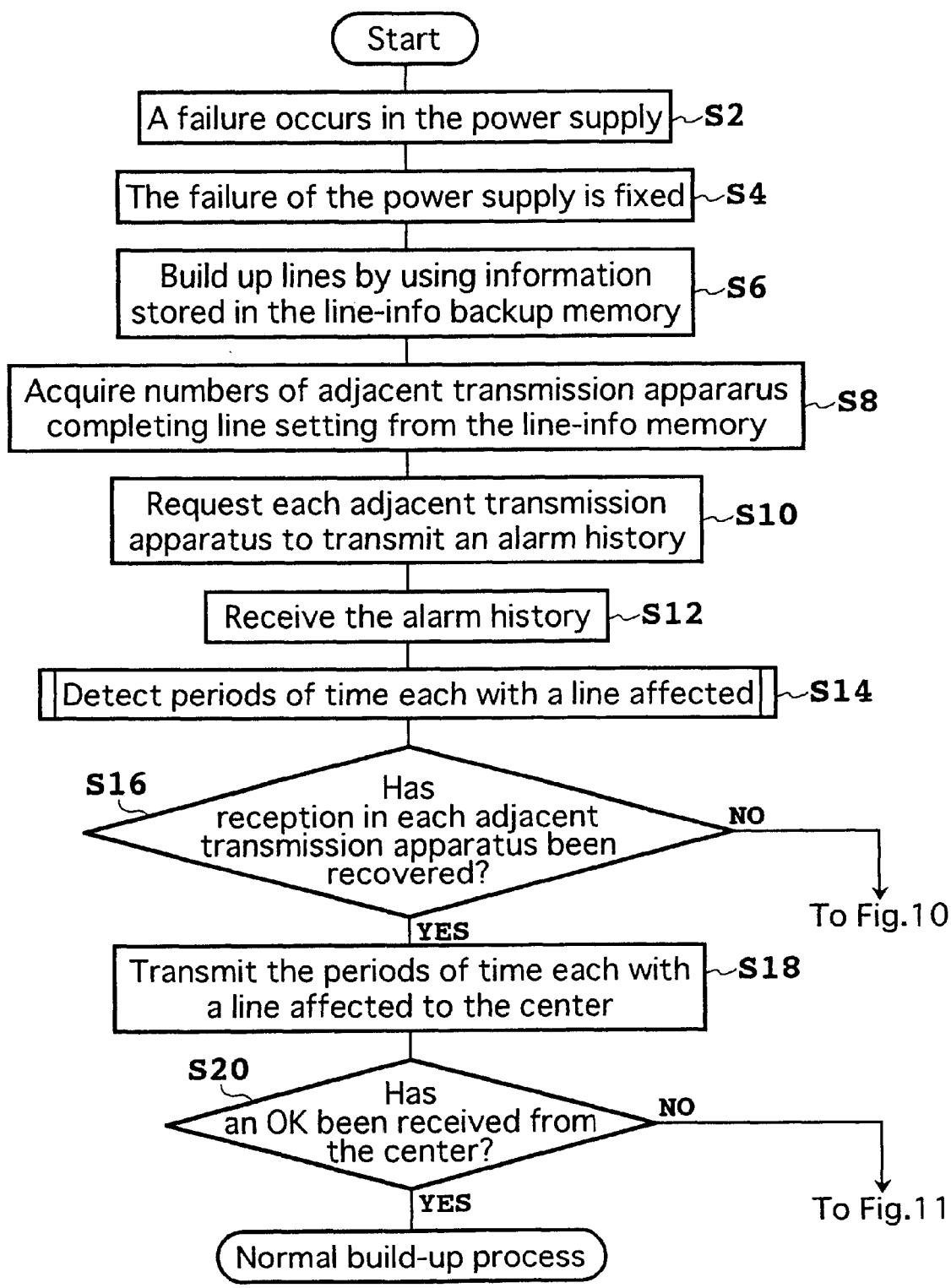
FIG. 8 shows a flowchart representing alarm-history gathering processing.
Figure 9:
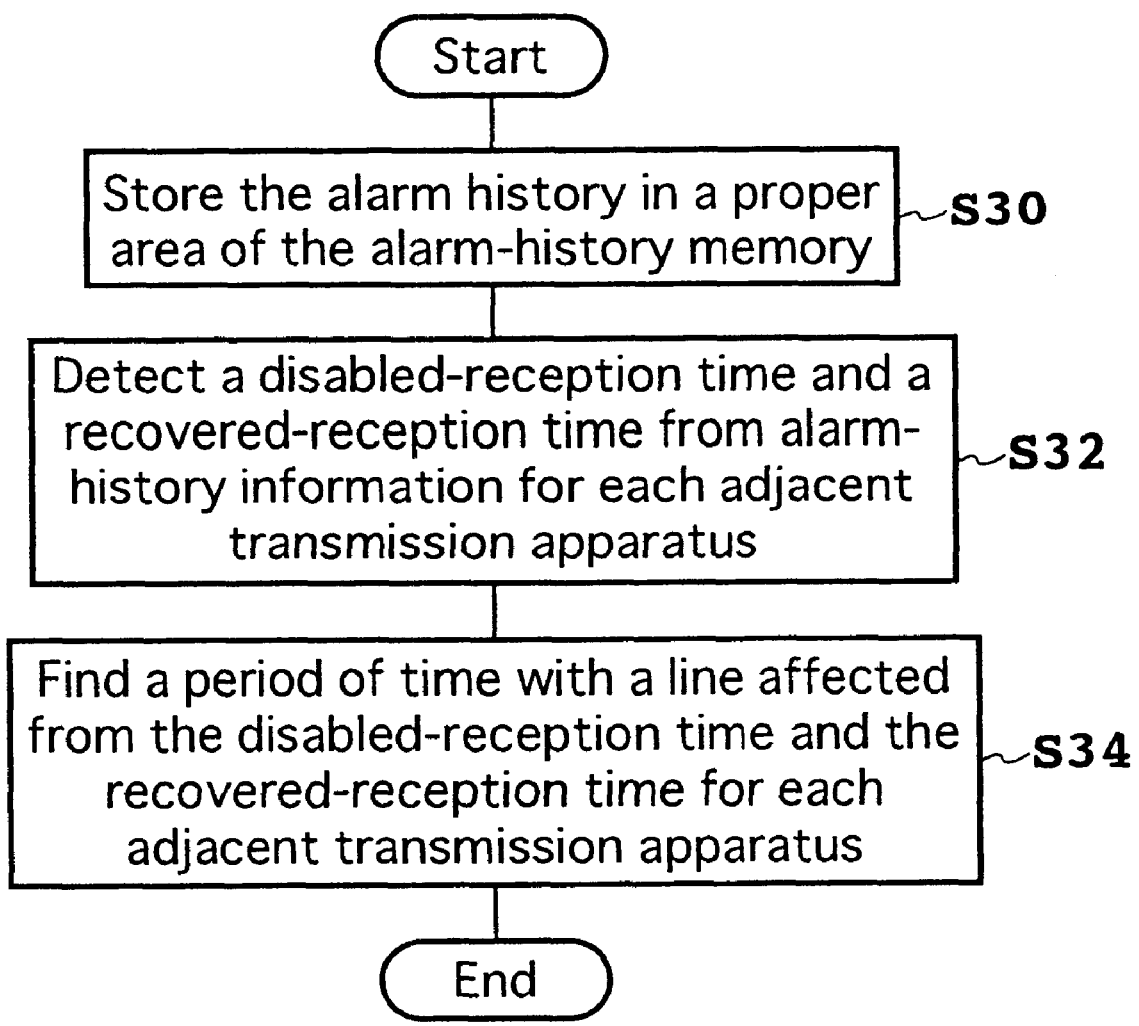
FIG. 9 shows a flowchart showing details of processing of a step S14 of the flowchart shown in FIG. 8.

At a step S4 of the flowchart shown in FIG. 8, the failure of the power-supply unit 44 is fixed. When the supply of electric power by the power-supply unit 44 is restored, the monitoring/control unit 48 employed in the transmission apparatus 30A #1 recognizes the recovery of the supply of electric power by detecting the normal level of a voltage generated by the power-supply unit 44. At a step S6, the monitoring/control unit 48 loads line-setting information from the line-information backup memory 52 to the line-information memory 50, putting transmission lines in a build-up state. The monitoring/control unit 48 also controls cross connection of the XC unit 66 in accordance with the line-setting information, and requests the payload-data insertion unit 72 #i and the SOH insertion unit 74 #i associated with the output port subjected to the line setting to insert payload data and SOH respectively. The SOH insertion unit 74 #i inserts an SOH in accordance with the request made by the monitoring/control unit 48. On the other hand, the payload-data insertion unit 72 #i inserts payload data cross-connected in the XC unit 66. The line termination unit 75 #i converts frame data of the main signal into data with a signal format for an external interface, transmitting the external-interface-formatted signal to the adjacent transmission apparatuses 30A #5, 30A #7, 30B #1 and 30C #1 through transmission lines which are shown in none of the figures.

In this example, when the transmission apparatus 30A #1 is recovered from the failure of the power-supply unit 44 employed therein, the monitoring/control unit 48 loads line-setting information from the line-information backup memory 52 to the line-information memory 50. A frame is transmitted to each of adjacent transmission apparatuses connected to lines with information thereof normally loaded as the failure of the power-supply unit 44 is fixed. In this example, a frame is transmitted to each of the adjacent transmission apparatuses 30A #5, 30A #7, 30B #1 and 30C #1. It should be noted that, immediately after the supply of electric power is restored, a main signal may not be transmitted by an adjacent transmission apparatus to the transmission apparatus 30A #1 in which a failure of the power-supply unit 44 has occurred. If transmitted, payload data may not be included in the main signal. Nevertheless, a main signal received by the transmission apparatus 30A #1 includes at least an SOH. The line termination unit 40 #j in each of the adjacent transmission apparatuses 30A #5, 30A #7, 30B #1 and 30C #1 converts the main signal received from the transmission apparatus 30A #1 into a signal of an internal interface format. The alarm unit 46 in each of the adjacent transmission apparatuses 30A #5, 30A #7, 30B #1 and 30C #1 separates an SOH from the signal with the internal interface format. The SOH is checked to determine whether or not the reception has been recovered.

When the alarm unit 46 of each of the adjacent transmission apparatuses 30A #5, 30A #7, 30B #1 and 30C #1 notices a state of recovered reception (recovered REC) of a main signal revealed by the line termination unit 40 #j connected to the transmission apparatus 30A #i, the alarm unit 46 informs the centers 32A and 32B through the LAN IF unit 64 as well as the monitoring/control unit 48 that the line termination unit 40 #j is again capable of receiving a main signal. When the reception by the line termination unit 40 #j is recovered, the monitoring/control unit 48 stores alarm information indicating the recovered reception along with the apparatus number of the adjacent transmission apparatus 30A #1 connected to the line termination unit 40 #j and the alarm-generation time into the history recording unit 60. At a step S8, on the other hand, the monitoring/control unit 48 employed in the transmission apparatus 30A #1 acquires the apparatus numbers of all the adjacent transmission apparatuses 30A #5, 30A #7, 30B #1 and 30C #1 completing the line setting and the port number of the line termination unit 75 #i connected to the adjacent transmission apparatuses 30A #5, 30A #7, 30B #1 and 30C #1 from the line-information backup memory 52. At a step S10, the monitoring/control unit 48 gives an instruction to the request unit 68 to transmit a demanding command through the line termination unit 75 #i identified by the port number. In turn, the request unit 68 outputs demanding commands to the SOH insertion unit 74 #i identified by the port number specified by the monitoring/control unit 48. As shown in FIG. 4, the demanding commands each comprise the apparatus number of the transmission apparatus 30A #1, the apparatus number of an adjacent transmission apparatus and an alarm-history requesting code. The apparatus number of the transmission apparatus 30A #1 is the address of the transmission source which is 11001011 in the example shown in FIG. 4. On the other hand, the adjacent transmission apparatuses are the adjacent transmission apparatuses 30A #5, 30A #7, 30B #1 and 30C #1 and the apparatus number of an adjacent transmission apparatus serves as the address of a transmission destination such as 10010011 in the example shown in FIG. 4.

The SOH insertion unit 74 #i inserts synchronization bits into the A1 and A2 field and the elements of the demanding command into the predetermined areas of D1 to D12 of the SOH shown in FIG. 6. Typically, the addresses of the transmission source and the transmission destination are inserted into D1 and D2 respectively whereas the alarm-history requesting code is inserted into D3 to D12. As shown in FIG. 7, the SOH is then output to the line termination unit 75 #i which converts a main signal including the demanding command into a signal with an external interface format. As shown in FIG. 12, the signals each having the external interface format are then transmitted to the adjacent transmission apparatuses 30A #5, 30A #7, 30B #1 and 30C #1 to request the adjacent transmission apparatuses 30A #5, 30A #7, 30B #1 and 30C #1 that alarm-history data be transmitted to the transmission apparatus 30A #1. The line termination unit 40 #j in each of the adjacent transmission apparatuses 30A #5, 30A #7, 30B #1 and 30C #1 receives the received main signal including a demanding command as shown in FIG. 7, converting the received main signal into a signal with an internal interface format which is supplied to the SOH termination unit 42 #j. The SOH termination unit 42 #j establishes synchronization by using the synchronization bits inserted into the A1 and A2 field of the SOH, extracting D1 to D12 from the SOH. D1 to D12 are then supplied to the response unit 70.

The response unit 70 checks D1 to D12 input thereto to find out whether or not the address of the transmission destination included in D1 to D12 is the apparatus number of the transmission apparatus employing the response unit 70 and whether or not an alarm-history requesting code is included. If the address of the transmission destination is indeed the apparatus number of the transmission apparatus employing the response unit 70 and the alarm-history requesting code is included, the response unit 70 informs the monitoring/control unit 48 of the fact that a demanding command has been received and the apparatus number of the transmission apparatus 30A #1 which serves as a transmission source. Using the apparatus number of the transmission source as an index, the monitoring/control unit 48 searches the history recording unit 60 for pieces of alarm-history information each including an alarm description and an alarm-generation time associated with apparatus number and acquires all the pieces of alarm-history information in a chronological order of the alarm-generation times. The monitoring/control unit 48 then requests the response unit 70 to transmit the acquired pieces of alarm-history information to the transmission apparatus 30A #1. The response unit 70 outputs the alarm-history information and the apparatus number of the transmission apparatus 30A #1 to the SOH insertion unit 74 #j associated with the apparatus number of the transmission apparatus 30A #1. The SOH insertion unit 74 #j inserts the apparatus number of its own transmission apparatus employing the SOH insertion unit 74 #j as the address of a transmission source, the apparatus number of the transmission apparatus 30A #1 as the address of a transmission destination and the alarm-history information in predetermined areas of D1 to D12 as shown in FIG. 5. In the example shown in FIG. 5, the apparatus number used as the address of a transmission source and the apparatus number used as the address of a transmission destination are 10010011 and 11001011 respectively. It should be noted that a plurality of pieces of alarm-history data each comprising the address of a transmission source, the address of a transmission destination and alarm-history information are inserted into different frames with each piece of alarm-history data accommodated in the SOH of a frame and the last piece indicated by specific data inserted into the SOH of the last frame. The line termination unit 75 #j converts a main signal including the alarm-history data into a signal having an external interface format which is then transmitted to the transmission apparatus 30A #1 as shown in FIG. 12 through a transmission line which is shown in none of the figures.

At a step S12 of the flowchart shown in FIG. 8, the line termination unit 40 #i employed in the transmission apparatus 30A #1 receives the signal including the alarm-history data from the line termination unit 75 #j of each of the adjacent transmission apparatuses, converting the signal into a signal with an internal interface format. The SOH termination unit 42 #i extracts D1 to D12 of the SOH from the signal, supplying D1 to D12 to the request unit 68. The request unit 68 checks D1 to D12 to determine whether or not the address of the transmission destination is indeed the transmission number of its own transmission apparatus 30A #1. If the address of the transmission destination is indeed the transmission number of the transmission apparatus 30A #1, the alarm-history information and the address of the transmission origin are supplied to the monitoring/control unit 48. At a step S14, the monitoring/control unit 48 passes on the alarm-history information and the address of the transmission source to the judgment unit 54, requesting the judgment unit 54 to detect a period of time with a transmission line affected. Details of the processing carried out at the step S14 are represented by a flowchart shown in FIG. 9. As shown in the figure, the flowchart begins with a step S30 at which the judgment unit 54 sequentially receives the pieces of alarm-history information received from the adjacent transmission apparatuses each serving as a transmission source, piece after piece, and extracts alarm-history information including a most recent disabled-reception time and a most recent recovered-reception time, storing the alarm-history information into the alarm-history memory 56 in an area prepared for all adjacent transmission apparatuses each serving as a transmission source.

At a step S32, the judgment unit 54 extracts a disabled-reception time and a recovered-reception time from the alarm-history information stored in the alarm-history memory 56 for each of the adjacent transmission apparatuses. At a step S34, the judgment unit 54 finds a period of time with a transmission line affected from the disabled-reception time and the recovered-reception time for each of the adjacent transmission apparatuses. The flow of the processing then goes back to a step S16 of the flowchart shown in FIG. 8 at which the judgment unit 54 forms a judgment as to whether or not reception has been recovered in every adjacent transmission apparatus completing line setting based on the line-setting information stored in the line-information backup memory 52. The judgment is formed by checking the period of time with a transmission line affected for each of the adjacent transmission apparatuses. If reception has been recovered in every adjacent transmission apparatus, the flow of the processing goes on to a step S18. If reception of any adjacent transmission apparatus has not been recovered, on the other hand, the monitoring/control apparatus 48 is informed of the adjacent transmission apparatus that has not been recovered from the disabled reception.

Figure 15:
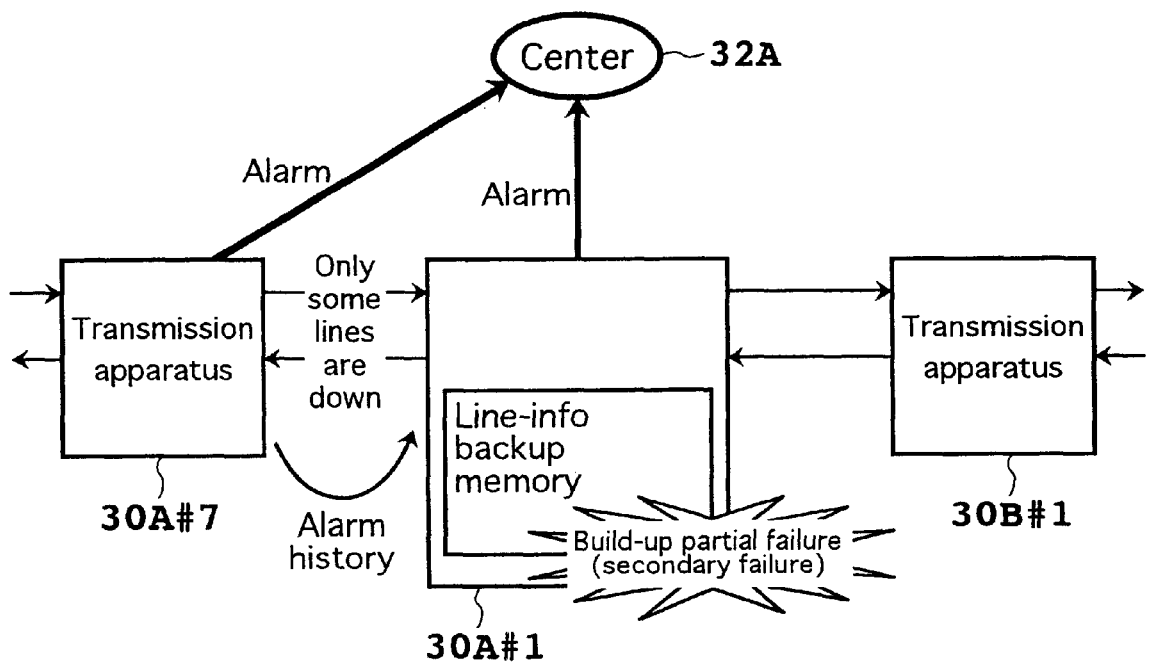
FIG. 15 is a diagram showing generation of a secondary failure.

FIG. 15 is a diagram showing generation of a secondary failure. As shown in the figure, when the transmission apparatus 30A #1 puts transmission lines in a build-up state by loading line-setting information from the line information backup memory 52 into the line-information memory 50, the build-up process of a transmission line may end in a failure due to typically a read error in the line-setting information for the transmission line. Assume that a read error in the line-setting information for the transmission line between the transmission apparatus 30A #1 and the adjacent transmission apparatus 30A #7 is generated. In such a case, since a main signal is not transmitted from the line termination unit 75 #i of the transmission apparatus 30A #1 to the adjacent transmission apparatus 30A #7, reception in the adjacent transmission apparatus 30A #7 is not recovered. On the other hand, a demanding command is based on line-setting information which is read out correctly from the line-information backup memory 52 instead of the line-information memory 50. The demanding command is transmitted by the line termination unit 75 #i employed in the transmission apparatus 30A #1 to the adjacent transmission apparatus 30A #7 which transmits its alarm-history data to the transmission apparatus 30A #1 in response to the demanding command. Since reception in the adjacent transmission apparatus 30A #7 has not been recovered yet, however, the transmission apparatus 30A #1 is not capable of finding a period of time with a transmission line affected for the adjacent transmission apparatus 30A #7. That is to say, if the outcome of the judgment formed at the step S16 indicates that reception of any adjacent transmission apparatus has not been recovered due to typically a secondary failure generated as described above, on the other hand, the flow of the processing goes on to a step S40 of a flowchart shown in FIG. 10 at which line setting is repeated. As for the sequence chart, the flow of the processing carried out by the transmission apparatus 30A #1 jumps from FIG. 12 to FIG. 13.

At the step S18, the judgment unit 54 transmits the periods of time each with a transmission line affected of the adjacent transmission apparatuses 30A #5, 30A #7, 30B #1 and 30C #1, the apparatus number of the transmission apparatus 30A #1 employing the judgment unit 54 and the apparatus numbers of the adjacent transmission apparatuses 30A #5, 30A #7, 30B #1 and 30C #1 to the center 32A by way of the LAN IF unit 64. Receiving the apparatus number of the failing transmission apparatus 30A #1 and the apparatus numbers of the adjacent transmission apparatuses 30A #5, 30A #7, 30B #1 and 30C #1, the center 32A refers to line-setting information saved in the center 32A to determine whether or not the periods of time each with a transmission line affected of all adjacent transmission apparatuses connected to the failing transmission apparatus 30A #1 have been detected. If the periods of time each with a transmission line affected of all adjacent transmission apparatuses connected to the transmission apparatus 30A #1 have been detected, an OK signal is transmitted to the transmission apparatus 30A #1, a failure of the power-supply unit 44 of which has occurred. If the periods of time each with a transmission line affected of any adjacent transmission apparatuses connected to the transmission apparatus 30A #1 have not been detected, on the other hand, an NG signal is transmitted to the transmission apparatus 30A #1.

It should be noted that, even in the case of an adjacent transmission apparatus controlled by a center different from the center 32A controlling the transmission apparatus 30A #1 such as the adjacent transmission apparatus 30B #1 which is controlled by the center 32B, the line setting between the adjacent transmission apparatus 30B #1 and the failing transmission apparatus 30A #1 is carried out by the center 32A so that the center 32A has the line-setting information for the adjacent transmission apparatus 30B #1. That is to say, provided with pieces of line-setting information for all adjacent transmission apparatuses connected to the transmission apparatus 30A #1, the center 32A is capable of determining whether or not the periods of time each with a transmission line affected of all adjacent transmission apparatuses connected to the transmission apparatus 30A #1 have been detected. At a step S20, the monitoring/control unit 48 employed in the transmission apparatus 30A #1 determines whether or not an OK signal has been received from the center 32A. If an OK signal has been received, the monitoring/control unit 48 judges that the build-up process has been completed normally. If an NG signal has been received from the center 32A, on the other hand, the flow of the processing goes on to a step S52 of a flowchart shown in FIG. 11. As for the sequence chart, the flow of the processing carried out by the transmission apparatus 30A #1 jumps from FIG. 12 to FIG. 14.

The center 32A transmits an NG signal for example when the supply of electric power in the transmission apparatus 30A #1 is interrupted during line setting with the adjacent transmission apparatus 30A #7 so that the line-setting information can not be backed up in the line-information backup memory 52 employed in the transmission apparatus 30A #1. In this case, the adjacent transmission apparatus 30A #7 has completed line setting normally as viewed from the center 32A. Even after the supply of electric power in the transmission apparatus 30A #1 has been restored, however, the alarm information transmitted by the transmission apparatus 30A #1 to the center 32A still indicates that reception of a main signal in the adjacent transmission apparatus 30A #7 is still disabled. When the transmission apparatus 30A #1 receives alarm information indicating recovered reception from the adjacent transmission apparatuses 30A #5, 30B #1 and 30C #1, to the transmission apparatus 30A #1, the build-up process appears to have been completed normally even though line setting between the transmission apparatus 30A #1 and the adjacent transmission apparatus 30A #7 has not been carried out yet. Since an OK or NG signal is received by the transmission apparatus 30A #1 from the center 32A, however, the transmission apparatus 30A #1 is capable of determining as to whether or not the build-up process has been completed normally.

Figure 10:
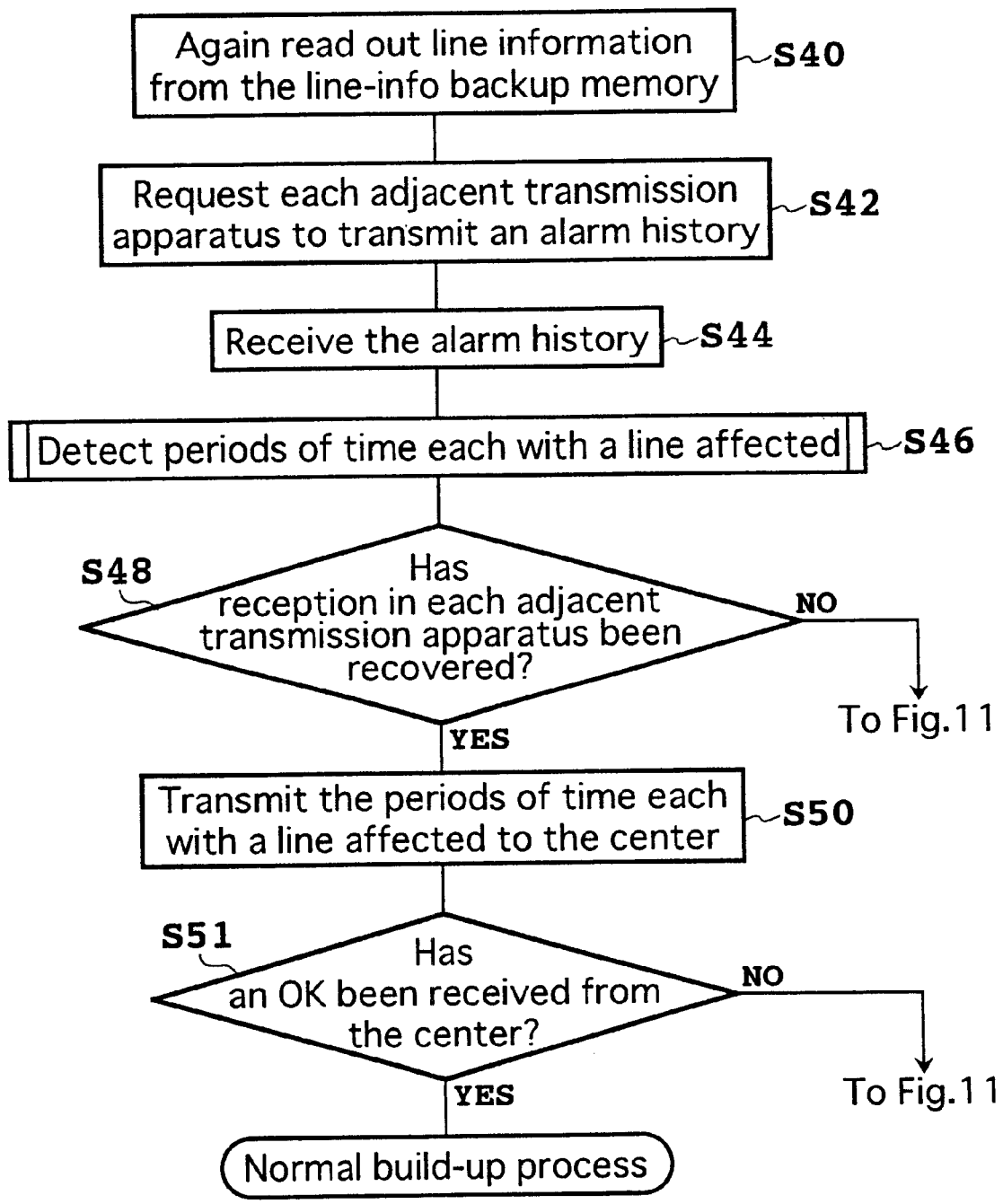
FIG. 10 shows a continuation of the flowchart representing the alarm-history gathering processing shown in FIG. 8.
Figure 11:
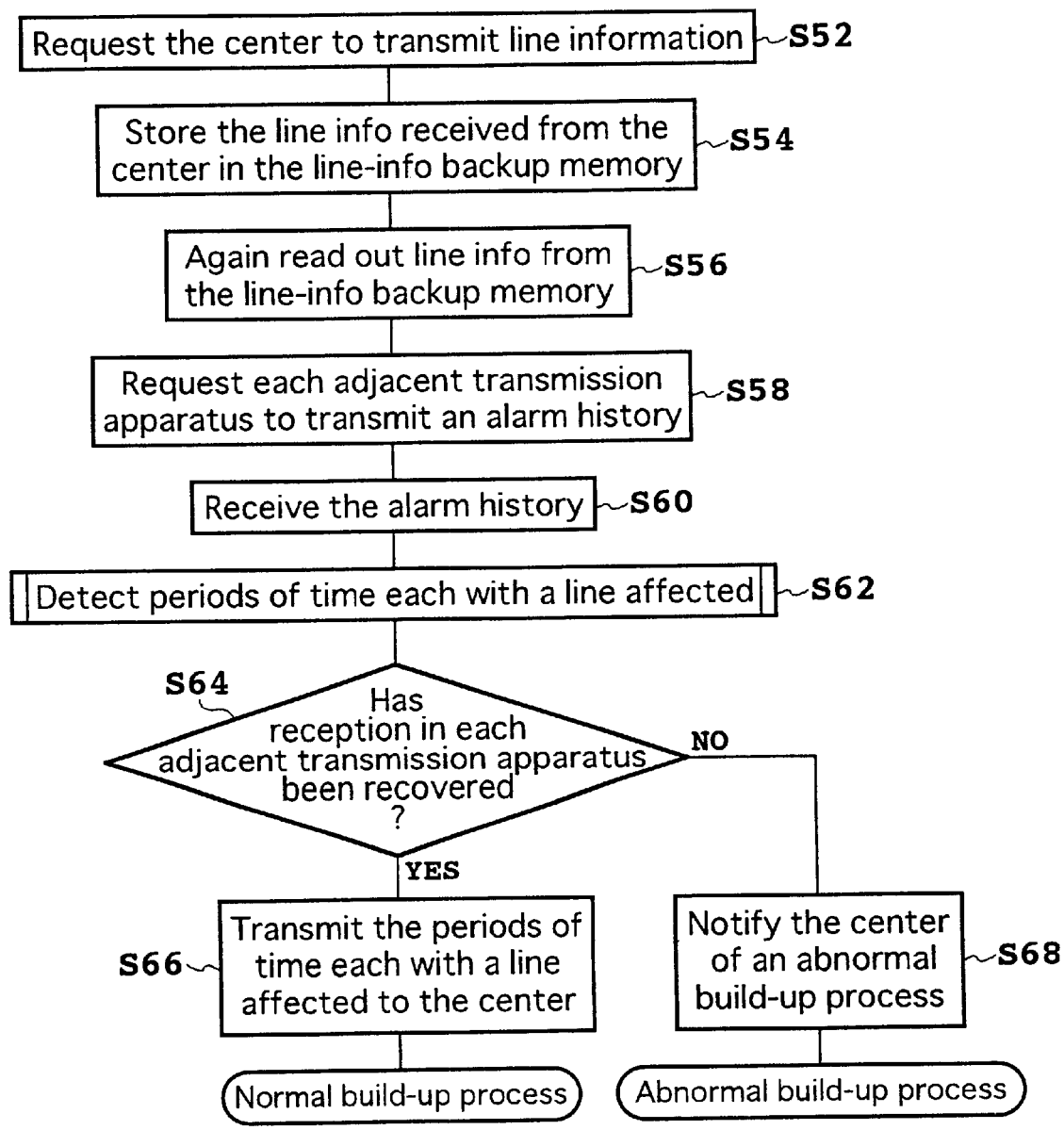
FIG. 11 shows another continuation of the flowchart representing the alarm-history gathering processing shown in FIG. 8.

At the step S40 of the flowchart shown in FIG. 10, the monitoring/control unit 48 reloads line-setting information from the line-information backup memory 52 to the line-information memory 50 to again carry out line setting. At a step S42, the monitoring/control unit 48 gives an instruction to the request unit 68 to transmit a demanding command. The demanding command is used for requesting the adjacent transmission apparatuses 30A #5, 30A #7, 30B #1 and 30C #1 to transmit alarm-history data to the transmission apparatus 30A #1 as is the case with the step S10 of the flowchart shown in FIG. 8. At a step S44, the transmission apparatus 30A #1 receives the pieces of alarm-history data from the adjacent transmission apparatuses 30A #5, 30A #7, 30B #1 and 30C #1 as is the case with the step S10 of the flowchart shown in FIG. 8. At a step S46, the judgment unit 54 employed in the transmission apparatus 30A #1 detects periods of time each with a transmission line affected as is the case with the step S14 of the flowchart shown in FIG. 8. At a step S48, the judgment unit 54 forms a judgment as to whether or not reception has been recovered in each of the adjacent transmission apparatuses 30A #5, 30A #7, 30B #1 and 30C #1 as is the case with the step S16 of the flowchart shown in FIG. 8. If reception has been recovered in each of the adjacent transmission apparatuses 30A #5, 30A #7, 30B #1 and 30C #1, the flow of the processing goes on to a step S50. If reception in any of the adjacent transmission apparatuses 30A #5, 30A #7, 30B #1 and 30C #1 has not been recovered, on the other hand, the flow of the processing goes on to the step S52 of the flowchart shown in FIG. 11. As for the sequence chart, the flow of the processing carried out by the transmission apparatus 30A #1 jumps from FIG. 12 to FIG. 14. In this way, the transmission apparatus 30A #1 can be recovered automatically from a secondary failure by again carrying out the line setting in the event of such a secondary failure occurs.

At the step S50, the judgment unit 54 transmits the periods of time each with a transmission line affected of the adjacent transmission apparatuses 30A #5, 30A #7, 30B #1 and 30C #1, the apparatus number of the transmission apparatus 30A #1 employing the judgment unit 54 and the apparatus numbers of the adjacent transmission apparatuses 30A #5, 30A #7, 30B #1 and 30C #1 to the center 32A as is the case with the step S18 of the flowchart shown in FIG. 8. At a step S51, the monitoring/control unit 48 employed in the transmission apparatus 30A #1 determines whether or not an OK signal has been received from the center 32A. If an OK signal has been received, the monitoring/control unit 48 judges that the build-up process has been completed normally. If an NG signal has been received from the center 32A, on the other hand, the flow of the processing goes on to the step S52 of the flowchart shown in FIG. 11. As for the sequence chart, the flow of the processing carried out by the transmission apparatus 30A #1 jumps from FIG. 12 to FIG. 14. At the step S52 of the flowchart shown in FIG. 11, the monitoring/control unit 48 requests the center 32A through the LAN IF unit 64 to transmit line-setting information. In response to this request, the center 32A transmits the line-setting information for the failing transmission apparatus 30A #1 as shown in FIG. 14. At a step S54, the monitoring/control unit 48 employed in the transmission apparatus 30A #1 stores the line-setting information received from the center 32A in the line-information backup memory 52.

At a step S56, the monitoring/control unit 48 reloads line-setting information from the line-information backup memory 52 to the line-information memory 50 to again carry out line setting as is the step S40 of the flowchart shown in FIG. 10. At steps S58 to S66, the transmission apparatus 30A #1 carries out the same pieces of processing as the steps S10 to S18 of the flowchart shown in FIG. 8. If the outcome of the judgment formed at the step S64 indicates that reception has been recovered in each of the adjacent transmission apparatuses 30A #5, 30A #7, 30B #1 and 30C #1, the flow of the processing goes on to the step S66. If reception in any of the adjacent transmission apparatuses 30A #5, 30A #7, 30B #1 and 30C #1 has not been recovered, on the other hand, the flow of the processing goes on to a step S68. At the step S68, the monitoring/control unit 48 notifies the center 32A through the LAN IF unit 64 of an abnormal build-up process. Informed of the abnormal build-up process by the failing transmission apparatus 30A #1, the center 32A outputs periods of time each with a transmission line affected of the adjacent transmission apparatuses 30A #5, 30A #7, 30B #1 and 30C #1 typically to a display unit. The person in charge of maintenance checks the periods of time each with a transmission line affected appearing typically on the display unit to determine which of the adjacent transmission apparatuses 30A #5, 30A #7, 30B #1 and 30C #1 is affected by the interrupted supply of electric power in the transmission apparatus 30A #1. At the step S66, on the other hand, the judgment unit 54 transmits the periods of time each with a transmission line affected of the adjacent transmission apparatuses 30A #5, 30A #7, 30B #1 and 30C #1, the apparatus number of the transmission apparatus 30A #1 employing the judgment unit 54 and the apparatus numbers of the adjacent transmission apparatuses 30A #5, 30A #7, 30B #1 and 30C #1 to the center 32A as is the case with the step S50 of the flowchart shown in FIG. 10.

According to the first embodiment described so far, a failing transmission apparatus sends a demanding command to adjacent transmission apparatuses, requesting the adjacent apparatuses that alarm-history data be transmitted to the failing apparatus. The failing transmission apparatus then detects periods of time each with a transmission line affected from the pieces of alarm-history data, transmitting the periods of time each with a transmission line affected to a center. As a result, the periods of time each with a transmission line affected can be detected in a short time. In the event of a secondary failure occurring in the failing transmission apparatus, line setting is repeated so that the failing apparatus can be automatically recovered from the secondary failure. In addition, for a line affected by a power-supply interruption during line setting, line-setting information automatically down loaded from the center to the failing transmission apparatus is used for line setting, making it possible to recover the line from the power-supply interruption in a short period of time.

Second Embodiment

Figure 16:
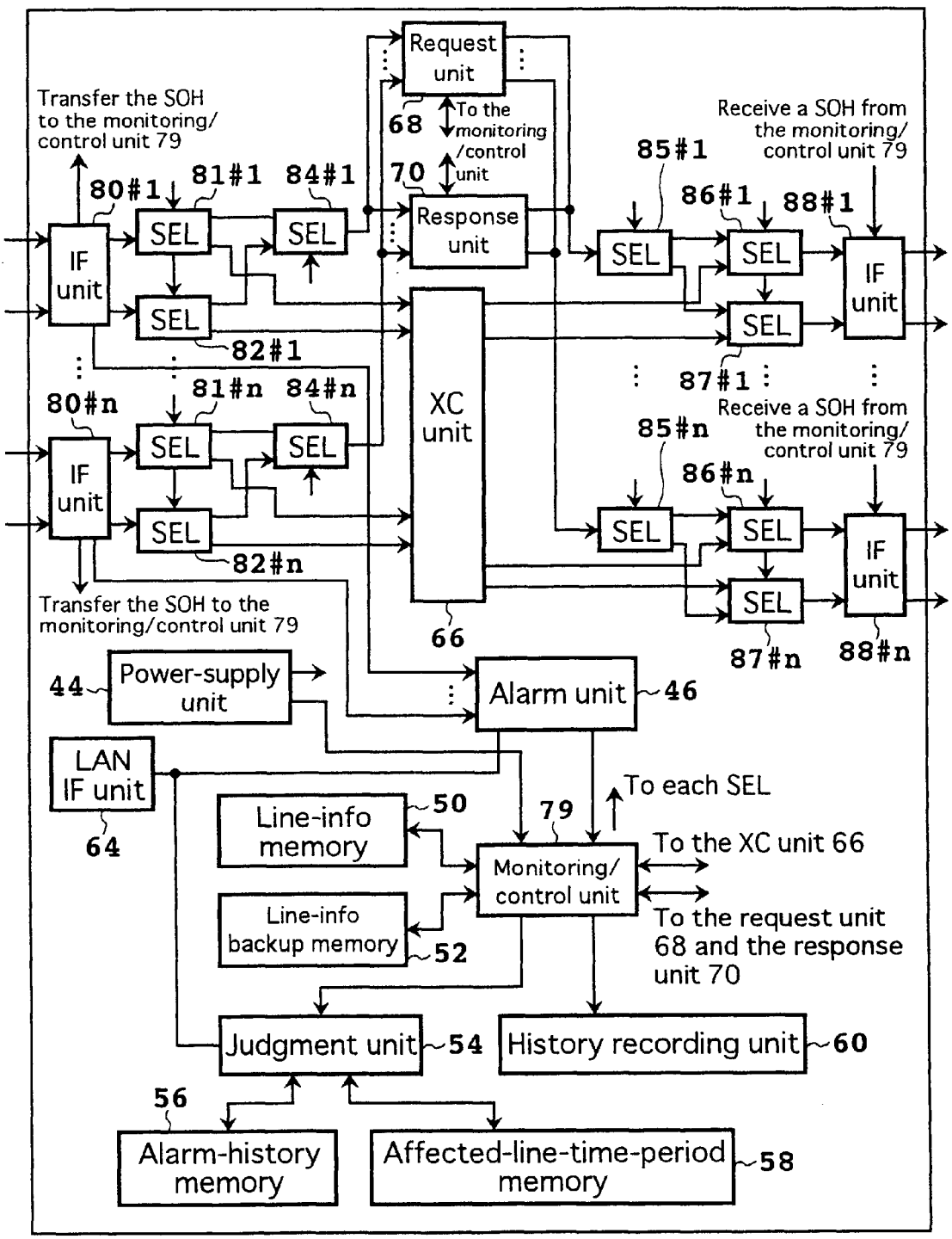
FIG. 16 is a diagram showing the configuration of a transmission apparatus implemented by a second embodiment of the present invention.

FIG. 16 is a diagram showing the configuration of a transmission apparatus implemented by a second embodiment of the present invention. Components virtually identical with those employed in the configuration shown in FIG. 3 are denoted by the same reference numerals as the latter. The transmission apparatus implemented by the second embodiment of the present invention is different from the transmission apparatus shown in FIG. 3 in that, in the case of the former, transmission lines connected to an adjacent transmission apparatus are implemented in a redundant configuration comprising a currently used system and a spare system and a demanding command and alarm-history data are inserted into a payload of a transmission line pertaining to the spare system. In addition, a monitoring/control unit 79, IF units 80 #1 to 80 #n, selectors (SEL units) 81 #1 to 81 #n, 82 #1 to 82 #n, 84 #1 to 84 #n, 85 #1 to 85 #n, 86 #1 to 86 #n and 87 #1 to 87 #n and IF units 88 #1 to 88 #n newly employed in the second embodiment are another difference in configuration between the second embodiment and the transmission apparatus shown in FIG. 3.

To put it in detail, in addition to the functions of the monitoring/control unit 48 shown in FIG. 3, the monitoring/control unit 79 has a function of outputting select signals to the SEL units 81 #1 to 81 #n, 82 #1 to 82 #n, 84 #1 to 84 #n, 85 #1 to 85 #n, 86 #1 to 86 #n and 87 #1 to 87 #n to execute control so that, when neither demanding command nor alarm-history data is transmitted, the same main signal is output to a 0 system and a 1 system while, when a demanding command or alarm-history data is transmitted, on the other hand, the demanding command or the alarm-history data is output to a transmission line recognized by an adjacent transmission apparatus as an element pertaining to a spare system and a main signal input from a transmission line recognized by the self transmission apparatus employing the monitoring/control unit 79 as a spare is output to the request unit 68 and the alarm unit 70. It is worth noting that the 0 and 1 systems serve as the currently used and spare systems respectively or vice versa.

It should be noted that a demanding command is transmitted by a transmission apparatus, in which a failure caused by a power-supply interruption has occurred, to an adjacent transmission apparatus through a transmission line pertaining to the spare system of the adjacent transmission apparatus. The spare transmission line of the adjacent transmission apparatus has been reported by the adjacent apparatus to the failing transmission apparatus by inserting the input-port number of the spore adjacent transmission line immediately before the occurrence of the failure into an SOH. As an alternative, the spare transmission line can also be identified by including a relation between an output-port number of the transmission apparatus transmitting the demanding command and an input-port number of the adjacent transmission apparatus in the line-setting information. As for a transmission line pertaining to the spare system of a transmission apparatus in which the supply of electric power has been recovered, the input-port number of the spare system immediately before a power-supply interruption is stored in the line-information backup memory 52 in advance and the system to which an input port pertains is made the same as the one immediately prior to the power-supply interruption. That is to say, whether an input port pertains to the currently used or spare system is known from the information stored in the line-information backup memory 52 prior to the failure.

Figure 17:
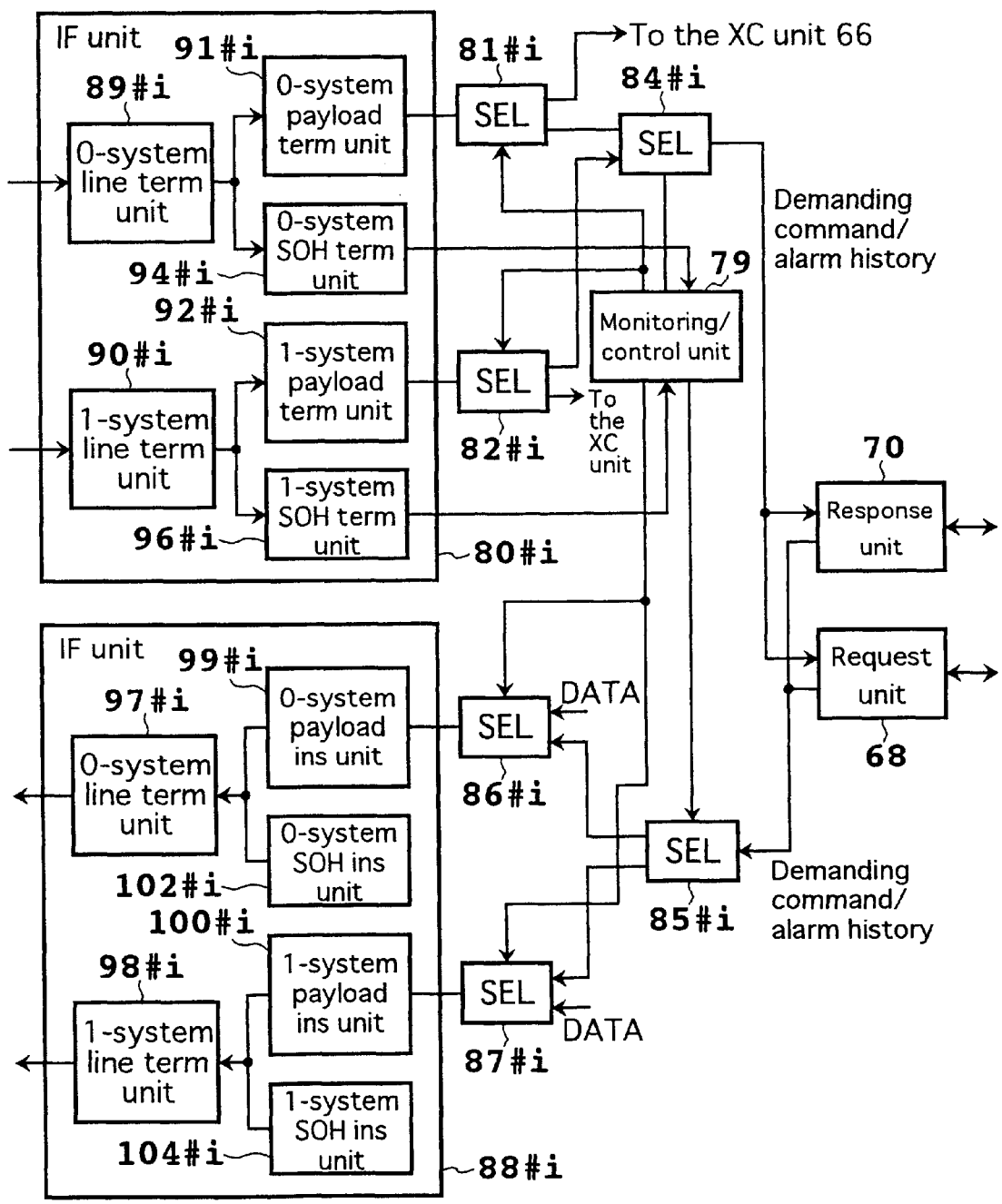
FIG. 17 is a block diagram showing IF units employed in the transmission apparatus shown in FIG. 16.
Figure 18:
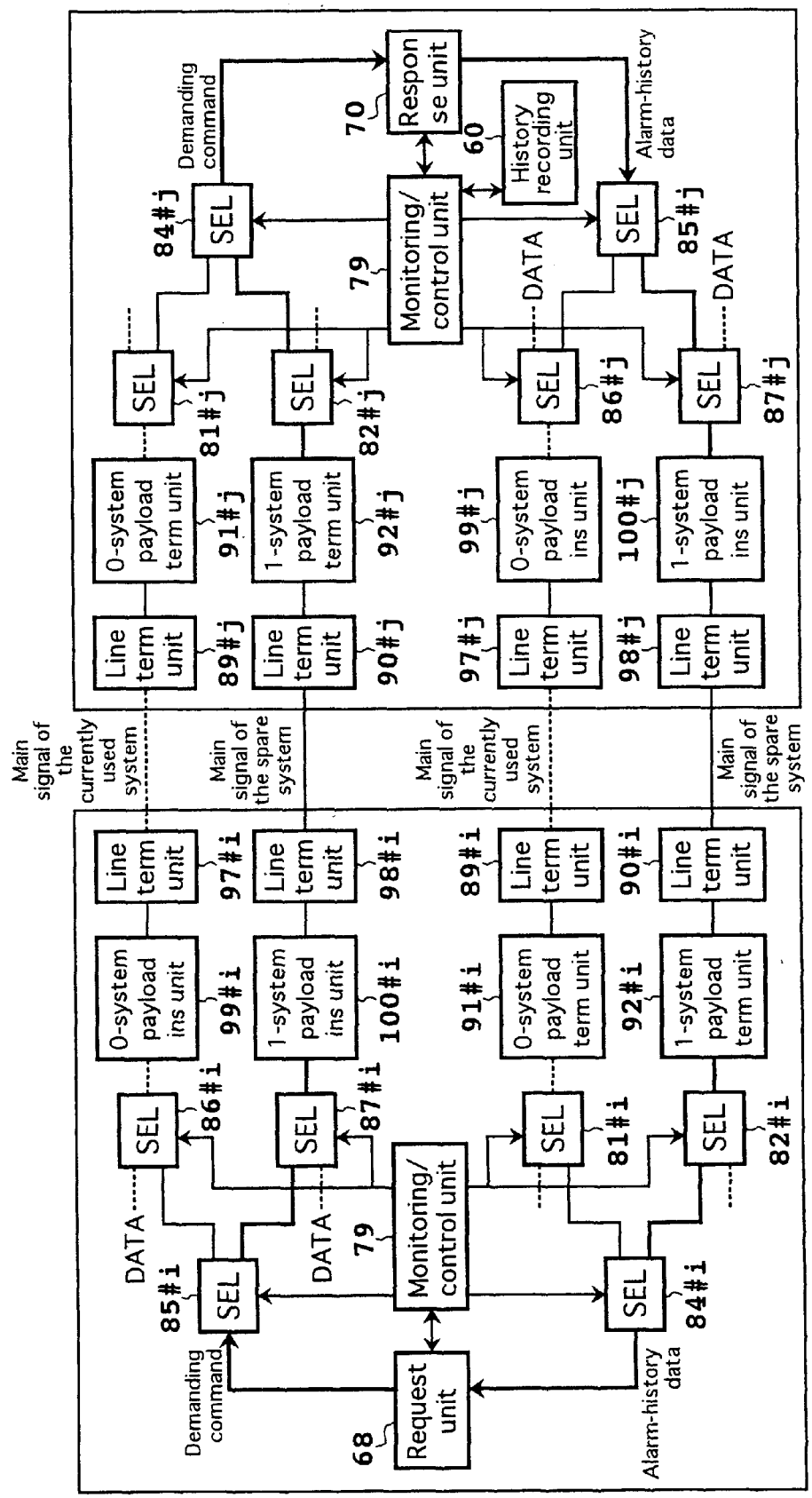
FIG. 18 is an explanatory diagram depicting the operation of the transmission apparatus shown in FIG. 16.

FIG. 17 is a block diagram showing the IF units 80 #i and 88 #i employed in the transmission apparatus shown in FIG. 16. As shown in FIG. 17, the IF unit 80 #i comprises a 0-system line termination unit 89 #i, a 0-system payload-data termination unit 91 #i, a 1-system line termination unit 90 #i, a 1-system payload-data termination unit 92 #i, a 0-system SOH termination unit 94 #i and a 1-system SOH termination unit 96 #i. The line termination units 89 #i, 90 #i, 97 #i and 98 #i each serve as an interface between an external interface and an internal interface. The payload-data termination units 91 #i and 92 #i are each used for separating payload data from a frame. The SOH termination units 94 #i and 96 #i each separate an SOH from a frame. The SEL unit units 81 #i and 82 #i each output payload data to either the XC unit 66 or the SEL unit 84 #i which is selected in accordance with a select signal. The SEL unit 84 #i selects payload data input from a transmission line of a spare system in accordance with a select signal, outputting the selected payload data to the request unit 68 and the response unit 70.

The SEL unit 85 #i passes on a signal output by the request unit 68 or the response unit 70 to either of the SEL unit units 86 #i and 87 #i which are recognized by one of adjacent transmission apparatuses connected to the line termination units 97 #i and 98 #i respectively as an element pertaining to the spare system as is selected by a select signal. In accordance with a select signal, the SEL units 86 #i and 87 #i each select inputs to be eventually forwarded to the line termination units 97 #i and 98 #i respectively as follows. With the SEL units 86 #i and 87 #i recognized by the adjacent transmission apparatuses connected to the line termination units 97 #i and 98 #i respectively as elements pertaining to a currently used system, the SEL unit units 86 #i and 87 #i always select a data signal (DATA). With the SEL units 86 #i and 87 #i recognized by the adjacent transmission apparatuses connected to the line termination units 97 #i and 98 #i respectively as elements pertaining to the spare system, on the other hand, the SEL unit units 86 #i and 87 #i select the output of the SEL unit 85 #i when a demanding command or alarm-history data is transmitted. Otherwise, the SEL unit units 86 #i and 87 #i select the data signal (DATA). In this way, the same main signal is transmitted to a transmission line pertaining to the spare system except when a demanding command or alarm-history data is transmitted.

Payload-data insertion units 99 #i and 100 #i are each used for inserting payload data. SOH insertion units 102 #i and 104 #i are each used for inserting information into an SOH in accordance with a command issued by the monitoring/control unit 79. The only differences in operation between the transmission apparatuses shown in FIGS. 16 and 3 are transmission and reception of a demanding command and alarm-history data. Since the rest is the same as the transmission apparatus shown in FIG. 3, the operation of the transmission apparatus shown in FIG. 16 is explained only in terms of the differences. During an operation, the monitoring/control unit 79 stores the input-port number of an input port connected to the line termination unit 89 #i or 90 #i which is connected to a transmission line pertaining to the spare system into the information-line backup memory 52. The monitoring/control unit 79 also drives the SOH insertion units 102 #i and 104 #i to insert the input-port number into SOHs prior transmission to adjacent transmission apparatuses. In addition, when the input-port number of an input port connected to a transmission line pertaining to the spare system is received from an adjacent transmission apparatus, the monitoring/control unit 79 stores the input-port number in the line-information backup memory 52.

Assume that a failure of the power supply employed in the transmission apparatus 30A #1 employed in the communication network shown in FIG. 2 occurs and, later on, the failure of the power supply is fixed. When the supply of electric power is recovered, the monitoring/control unit 79 loads line-setting information from the line-information backup memory 52 to the line-information memory 50, carrying out line setting. Then, the monitoring/control unit 79 sets one of the line termination units 89 #i and 90 #i as elements pertaining to the spare system and the other as elements pertaining to the currently used system in accordance with input-port numbers of transmission lines pertaining to the spare system stored in the line-information backup memory 52. In addition, the monitoring/control unit 79 sets one of the line termination units 97 #i and 98 #i as elements pertaining to the spare system and the other as elements pertaining to the currently used system in accordance with relations between the input-port numbers of adjacent transmission apparatus and the output-port number of the transmission apparatus 30A #1 stored in the line-information backup memory 52. In the following description, it is assumed that the line termination units 89 #i and 97 #i are set as elements pertaining to the spare system whereas the line termination units 90 #i and 98 #i are set as elements pertaining to the currently used system. The monitoring/control unit 79 outputs a select signal to the SEL unit 81 #i and the SEL unit 82 #i, requesting the SEL unit 81 #i and the SEL unit 82 #i to supply their outputs to the XC unit 66 and the SEL unit 84 #i respectively. In addition, the monitoring/control unit 79 outputs a select signal to the SEL unit 84 #i, requesting the SEL unit 84 #i to select a signal output by the SEL unit 82 #i.

The monitoring/control unit 79 also outputs a select signal to the SEL unit 85 #i, requesting the SEL unit 85 #i to supply its output to the SEL unit 87 #i. Furthermore, the monitoring/control unit 79 outputs a select signal to the SEL unit 86 #i, requesting the SEL unit 86 #i to select the data signal (DATA), and to the SEL unit 87 #i, requesting the SEL unit 87 #i to select a signal output by the SEL unit 85 #i. The request unit 68 outputs a demanding command to the SEL unit 85 #i. The SEL unit 85 #i outputs the demanding command to the SEL unit 87 #i. The SEL unit 87 #i selects a signal output by the SEL unit 85 #i, that is, the demanding command, outputting the demanding command to the payload-data insertion unit 100 #i. The payload-data insertion unit 100 #i inserts the demanding command into the beginning of the payload data, supplying the payload data to the line termination unit 98 #i. The SOH insertion unit 104 #i inserts synchronization bits and other information into an SOH, supplying the SOH to the line termination unit 98 #i. The line termination unit 98 #i converts a main signal including the demanding command into a signal with an external interface format. The signal with the external interface format is then output to a transmission line. The SEL unit 86 #i selects the data signal (DATA) output by the XC unit 66, outputting the data signal to the payload-data insertion unit 99 #i. The payload-data insertion unit 99 #i inserts the data signal (DATA) into the beginning of the payload data, supplying the payload data to the line termination unit 97 #i. The SOH insertion unit 102 #i inserts synchronization bits and other information into an SOH, supplying the SOH to the line termination unit 97 #i. The line termination unit 97 #i converts a main signal including the demanding command into a signal with an external interface format. The signal with an external interface format is then output to a transmission line.

In each of the adjacent transmission apparatuses 30A #5, 30A #7, 30B #1 and 30C #1, on the other hand, select signals are output to the SEL units 81 #j, 82 #j, 84 #j, 85 #j, 86 #j and 87 #j in accordance with the setting of the currently used and spare systems as is the case with the transmission apparatus 30A #1 in which a failure of the power supply occurs. The line termination units 97 #j and 89 #j employed in an adjacent transmission apparatus connected to the line termination units 89 #i and 97 #i pertaining to the currently used system in the transmission apparatus 30A #1 thus pertain to the currently used system. By the same token, the line termination units 98 #j and 90 #j employed in an adjacent transmission apparatus connected to the line termination units 90 #i and 98 #i pertaining to the spare system in the transmission apparatus 30A #1 respectively thus pertain to the spare system. The line termination unit 90 #j of the spare system converts a main signal including a demanding command into a signal with an internal interface format. The payload-data termination unit 92 #j separates payload data including the demanding command, supplying the payload data to the SEL unit 82 #j. The SEL unit 82 #j outputs the payload data including the demanding command to the SEL unit 84 #j in accordance with one of the select signals. The SEL unit 84 #j selects a signal output by the SEL unit 82 #j, that is the payload data including the demanding command, in accordance with one of the select signals, outputting the selected signal to the response unit 70.

The response unit 70 separates the demanding command from the payload data, supplying the demanding command to the monitoring/control unit 79. The monitoring/control unit 79 acquires alarm-history information related to the failing transmission apparatus 30A #1 from the history recording unit 60, outputting the information to the response unit 70 in response to the demanding command. The response unit 70 passes on the alarm-history data to the SEL unit 85 #j which then forwards the data to the SEL unit 87 #j in accordance with one of the select signals. The SEL unit 87 #j selects the alarm-history data received from the SEL unit 85 #j in accordance with one of the select signals, outputting the data to the payload-data insertion unit 100 #j. The payload-data insertion unit 100 #j inserts the alarm-history data into payload data, supplying the data to the line termination unit 98 #j. The line termination unit 98 #j converts a main signal including the alarm-history data into a signal an external interface format. The signal with an external interface format is then output to a transmission line. On the other hand, a main signal of the currently used system is supplied to the XC unit 66 to be cross-connected. Thus, there is no problem as far as the operation is concerned. In the transmission apparatus 30A #1 where a failure of the power supply thereof has occurred, on the other hand, the line termination unit 90 #i converts the main signal including the alarm-history data received from the adjacent transmission apparatuses into a signal with an internal interface format. The signal with an internal interface format is then supplied to the payload-data insertion unit 92 #i. The payload-data termination unit 92 #i separates payload data from the signal received from the line termination unit 90 # i, supplying the payload data to the SEL unit 82 #i. The SEL unit 82 #i passes on the payload data to the SEL unit 84 #i in accordance with a select signal.

The SEL unit 84 #i selects the payload data including the alarm-history data received from the SEL unit 82 #i in accordance with a select signal, supplying the payload data to the request unit 68. The request unit 68 extracts the alarm-history data from the payload data, outputting the alarm-history data to the monitoring/control unit 79. In this way, the failing transmission apparatus 30A #1 is capable of receiving alarm-history data by using payload data of a main signal. Since other operations of the second embodiment are similar to the first embodiment, it is not necessary to repeat their explanation. When normal completion of the build-up process of the failing transmission apparatus 30A #1 is verified, the monitoring/control unit 79 outputs select signals to the SEL units 81 #i, 82 #i, 84 #i, 85 #i, 86 #i and 87 #i so that the data signals (DATA) are supplied to transmission lines pertaining to the currently used and spare systems and main signals from the transmission lines pertaining to the currently used and spare system are passed on to the XC unit 66. According to the second embodiment described above, it is possible to obtain the same effects as those provided by the first embodiment.

Third Embodiment

Figure 19:
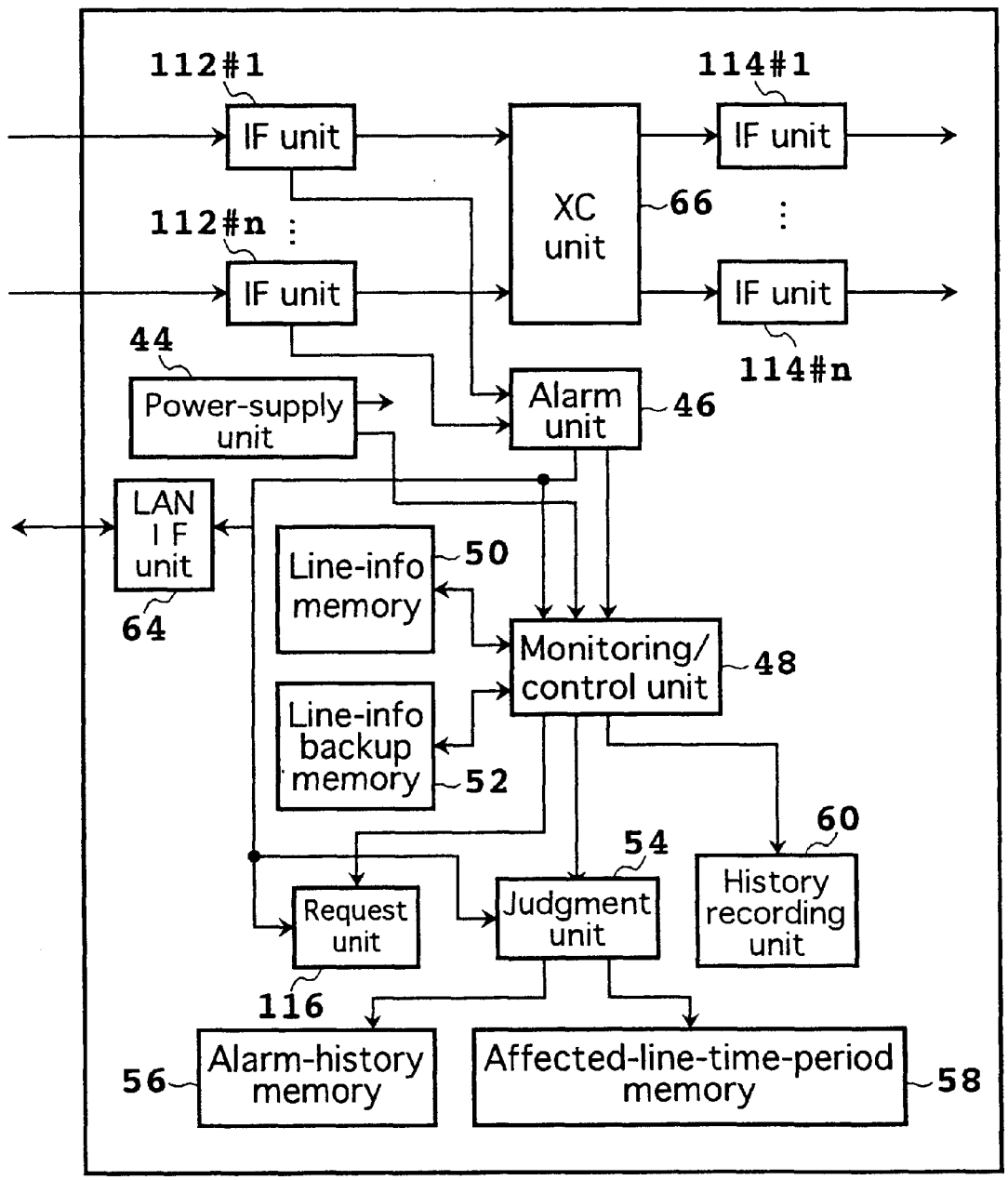
FIG. 19 is a diagram showing the configuration of a transmission apparatus implemented by a third embodiment of the present invention.

FIG. 19 is a diagram showing the configuration of a transmission apparatus implemented by a third embodiment of the present invention. Components virtually identical with those employed in the configuration shown in FIG. 3 are denoted by the same reference numerals as the latter. The transmission apparatus implemented by the third embodiment of the present invention is different from the transmission apparatus shown in FIG. 3 in that, in the case of the former, a demanding command is transmitted to the center 32A, requesting the center 32A to transmit alarm-history data to the transmission apparatus 30A #1. For this reason, the third embodiment employs IF units 112 #1 to 112 #n and 114 #1 to 114 #n as well as a request unit 116 which are different from their counterparts in the transmission apparatus shown in FIG. 3. The IF unit 112 #i serves as line, payload and SOH terminations. On the other hand, the IF unit 114 #i performs line-termination, payload-insertion and SOH-insertion functions. The request unit 116 transmits a demanding command specifying the apparatus numbers of its own transmission apparatus employing the request unit 16 and adjacent transmission apparatuses to the center 32A by way of the LAN IF unit 64. Alarm-history data transmitted by the center 32A in response to the demanding command is supplied to the monitoring/control unit 48. The center 32A thus has a function to find pieces of alarm-history data for the adjacent transmission apparatuses identified by the apparatus numbers specified in the demanding command with respect to the failing transmission apparatus 30A #1 identified by an apparatus number also specified in the demanding command and to transmit the pieces of alarm-history data to the transmission apparatus 30A #1 in response to a demanding command received from the transmission apparatus 30A #1.

The operation of the transmission apparatus shown in FIG. 19 is explained as follows. The following description explains merely transmission of a demanding command and reception of alarm-history data which are the only differences in operation between the transmission apparatuses shown in FIGS. 3 and 19. When the supply of electric power in the transmission apparatus 30A #1 is recovered, the monitoring/control unit 48 gives an instruction to the request unit 116 to transmit a demanding command to the center 32A. In accordance with the instruction, the request unit 116 transmits a demanding command specifying the apparatus numbers of the transmission apparatus 30A #1 and adjacent transmission apparatuses 30A #5, 30A #7 and so on which have been subjected to line setting to the center 32A by way of the LAN IF unit 64. In the center 32A, alarm information related to the adjacent transmission apparatuses received from the alarm units 46 employed in the failing and adjacent transmission apparatuses are stored in a history file along with the apparatus numbers of the failing and adjacent apparatuses as alarm-history data.

In response to a demanding command received from the transmission apparatus 30A #1, the center 32A searches the history file for pieces of alarm-history data related to the adjacent transmission apparatuses identified by the apparatus numbers specified in the demanding command with respect to the failing transmission apparatus 30A #1 identified by an apparatus number also specified in the demanding command. The center 32A then transmits the pieces of alarm-history data including the apparatus numbers of the transmission apparatus 30A #1 and the adjacent transmission apparatuses to the transmission apparatus 30A #1. The alarm-history data transmitted by the center 32A by way of the LAN IF unit 64 in response to the demanding command is supplied by the request unit 116 employed in the transmission apparatus 30A #1 to the monitoring/control unit 48. The judgment unit 54 detects a period of time with a transmission line affected for each of the adjacent transmission apparatuses which have been subjected to line setting in accordance with a request made by the monitoring/control unit 48. In this way, periods of time each with a transmission line affected can be detected from the alarm-history data received from the center 32A by way of the LAN IF unit 64. According to the third embodiment described above, it is possible to obtain the same effects as those provided by the first embodiment.

Fourth Embodiment

Figure 20:
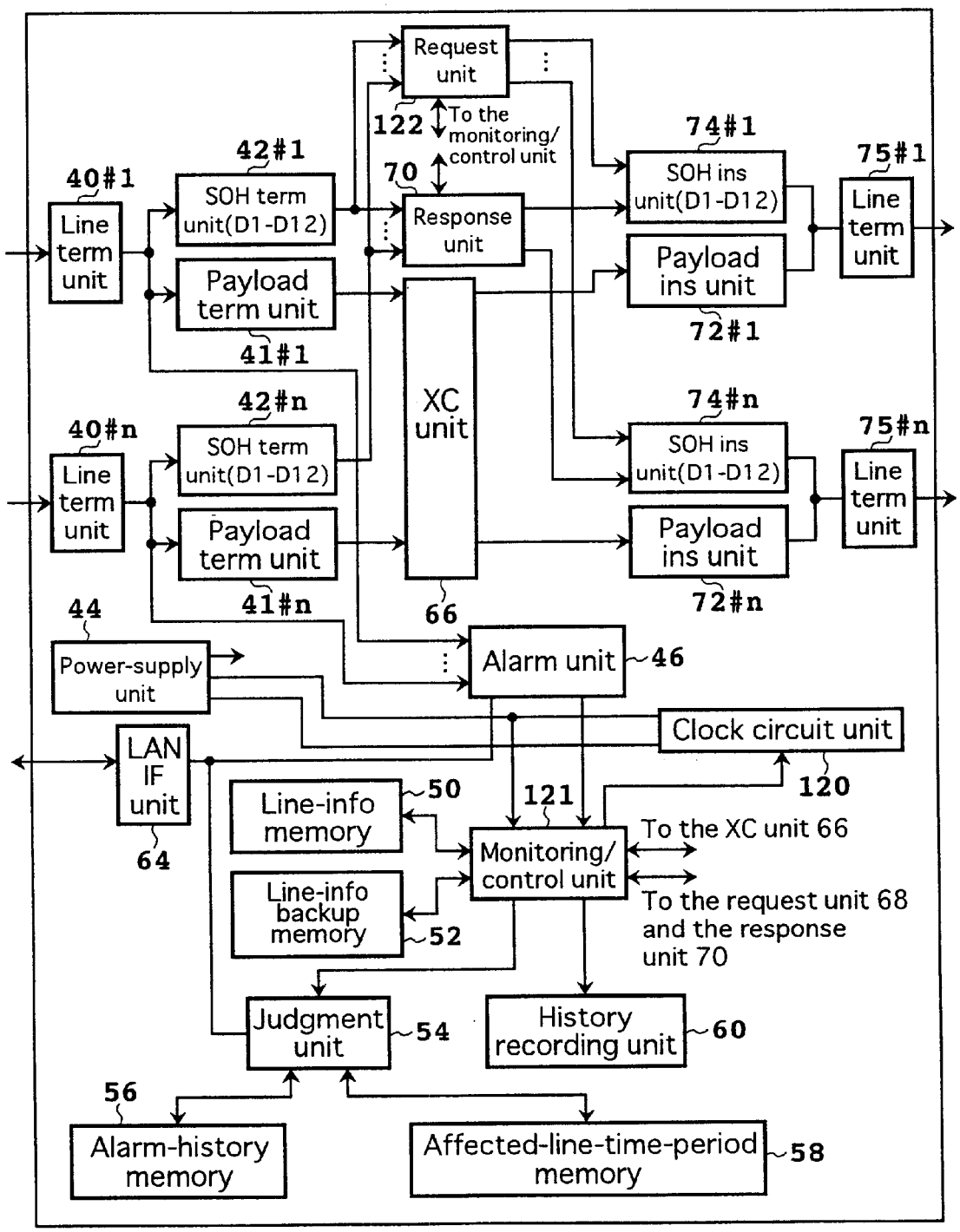
FIG. 20 is a diagram showing the configuration of a transmission apparatus implemented by a fourth embodiment of the present invention.

FIG. 20 is a diagram showing the configuration of a transmission apparatus implemented by a fourth embodiment of the present invention. Components virtually identical with those employed in the configuration shown in FIG. 3 are denoted by the same reference numerals as the latter. The transmission apparatus implemented by the fourth embodiment of the present invention is different from the transmission apparatus shown in FIG. 3 in that, in the case of the former, when the supply of electric power is interrupted, a clock signal is halted and there is provided a clock-circuit unit 120 driven by the clock signal for recording a power-supply-interruption time t1, that is, a time at which the supply of electric power is interrupted. Another difference is that a demanding command is transmitted to each adjacent transmission apparatus, requesting the apparatus to transmit only alarm-history data which is collected after the power-supply-interruption time t1. FIG. 21 is a block diagram showing the clock-circuit unit 120 employed in the transmission apparatus shown in FIG. 20. As shown in FIG. 21, the clock-circuit unit 120 comprises SEL units 128 and 130 as well as clock circuits 132 and 134. The SEL unit 128 selects a power-supply voltage of a main power supply (Main) 124 employed in the power-supply unit 44 if the supply of electric power is normal. If the supply of electric power by the main power supply 124 is interrupted, on the other hand, the ground voltage is selected by the SEL unit 128. The selected voltage is supplied to the clock circuit 132.

Like the SEL unit 128, the SEL unit 130 selects a power-supply voltage of the main power supply (Main) 124 employed in the power-supply unit 44 if the supply of electric power is normal. If the supply of electric power by the main power supply 124 is interrupted, on the other hand, a spare power supply (which is also referred to as a subsidiary power supply) (Sub) 126 is selected by the SEL unit 130. The selected voltage is supplied to the clock circuit 134. The clock circuit 132 updates the time of the day and records the time in a non-volatile memory which is not shown in the figure. When the supply of electric power by the main power supply 124 is interrupted, however, a voltage applied to the clock circuit 132 is grounded to a voltage of 0 v, halting the operation of the circuit 132. The clock circuit 134 also updates the time of the day but, unlike the clock circuit 132, receives electric power from the spare power supply 126 in case the supply of electric power by the main power supply 124 is interrupted. Thus, the operation of the clock circuit 134 is never halted. It should be noted that, the spare power supply 126 is electrically charged by the main power supply 124 during a normal operation and selected by the SEL unit 130 when the supply of electric power by the main power supply 124 is interrupted so that the supply of power to the clock circuit 134 is continued.

When the supply of electric power by the power-supply unit 44 is recovered, the monitoring/control unit 121 reads out the clock-termination time (or the power-supply interruption time) t1 from the non-volatile memory of the clock circuit 132 and gives an instruction to the request unit 122 to transmit a demanding command to each adjacent transmission apparatus, requesting the apparatus to submit only alarm-history data which is collected after the power-supply-interruption time t1. In accordance with the instruction received from the monitoring/control circuit 121, the request unit 122 transmits a demanding command to each adjacent transmission apparatus completing line setting, requesting the apparatus to submit only alarm-history data which is collected after the power-supply-interruption time t1.

FIG. 22 is a diagram showing a typical format of the demanding command. As shown in the figure, the demanding command comprises the address of a transmission source, the address of a transmission destination and an alarm-history requesting code which is collected after the power-supply-interruption time t1.

The operation of the transmission apparatus shown in FIG. 20 is explained as follows. The following description explains merely an operation to transmit and receive a demanding command and alarm-history data respectively which is the only difference in operation between the transmission apparatuses shown in FIGS. 3 and 20. When electric power is supplied by the main power supply 124 normally, the clock circuit 132 updates the time of the day and records the time in a non-volatile memory which is not shown in the figure and the spare power supply 126 is electrically charged by the main power supply 124. When the supply of electric power by the main power supply 124 is interrupted, a ground voltage of 0 V is selected by the SEL unit 128 and supplied to the clock circuit 132. That is to say, when the supply of electric power by the main power supply 124 is interrupted, the power-supply voltage supplied to clock circuit 132 becomes 0 V, halting the operation of the clock circuit 132. As a result, what is last recorded in the non-volatile memory is a time at which the supply of electric power in the transmission apparatus is interrupted.

As described above, the SEL unit 130 selects a power-supply voltage of the main power supply 124 employed in the power-supply unit 44 if the supply of electric power is normal. If the supply of electric power by the main power supply 124 is interrupted, on the other hand, the spare power supply 126 is selected by the SEL unit 130. The selected voltage is supplied to the clock circuit 134. Thus, electric power is always supplied to the clock circuit 134. To be more specific, when the main power supply 124 operates normally, electric power is supplied to the clock circuit 134 from the main power supply 124. If the supply of electric power by the main power supply 124 is interrupted, on the other hand, electric power is supplied to the clock circuit 134 from the spare power supply 126. When the supply of electric power by the main power supply 124 is recovered, the monitoring/control unit 121 reads out the power-supply interruption time t1 from the non-volatile memory of the clock circuit 132 and gives an instruction to the request unit 122 to transmit a demanding command to each adjacent transmission apparatus, requesting the apparatus to submit only alarm-history data that is collected after the power-supply-interruption time t1.

In accordance with the instruction received from the monitoring/control circuit 121, the request unit 122 outputs a demanding command to the SOH insertion unit 74 #i. The demanding command includes the apparatus number of the transmission apparatus 30A #1 as an transmission-source address, the apparatus number of an adjacent transmission apparatus as an transmission-destination address and an alarm-history requesting code that is collected after the power-supply-interruption time t1. The SOH insertion unit 74 #i inserts the demanding command into an SOH which is then output to the transmission line by way of the line termination unit 75 #i. In each of the adjacent transmission apparatuses, the response unit 70 receives the demanding command, passing on the command to the monitoring/control unit 121. The monitoring/control unit 121 reads out alarm-history data, which is obtained for the apparatus number specified in the demanding command as the transmission-destination address after the power-supply-interruption time t1 also specified in the demanding command, from the history recording unit 60, and then supplies the information to the response unit 70.

The response unit 70 outputs alarm-history data to the SOH insertion unit 74 #j. The alarm-history data includes the apparatus number of this adjacent transmission apparatus as an transmission-source address, the transmission-origin address included in the demanding command (that is, the apparatus number of the transmission apparatus 30A #1) as a transmission-destination address and the alarm-history data collected after the power-supply-interruption time t1. The SOH insertion unit 74 #j inserts the alarm-history data collected after the power-supply-interruption time t1 into an SOH which is then output to the transmission line by way of the line termination unit 75 #j. In the failing transmission apparatus 30A #1, the judgment unit 54 detects a period of time with a transmission line affected from the alarm-history data collected after the power-supply-interruption time t1. Collected by the adjacent transmission apparatus after the power-supply-interruption time t1, the amount of the alarm-history data received from the adjacent transmission apparatus is small so that a period of time with a transmission line affected can be detected in a short time. If the transmission apparatus 30A #1 completes the build-up process normally, the clock circuit 132 resumes the operation to update the time of the day by using the time updated by the clock circuit 134 as an initial value. Since other operations of the fourth embodiment are similar to the first embodiment, it is not necessary to repeat their explanation. According to the fourth embodiment, since only alarm-history data collected by an adjacent transmission apparatus after the power-supply-interruption time t1 is transmitted to the failing transmission apparatus, the amount of the alarm-history data received from the adjacent transmission apparatus is small so that a period of time with a transmission line affected can be detected by the failing transmission apparatus in a short time.

According to the embodiments described above, since a transmission apparatus in which a failure caused by a power-supply interruption has occurred detects a period of time with a transmission line affected and reports the period to a center, the period can be detected in a short time. In addition, if reception in any of adjacent transmission apparatuses completing line setting carried out by the failing apparatus is not recovered, the line setting is repeated so that an automatic recovery is possible even if a secondary failure occurs. Furthermore, since formation of a judgment by the center as to whether or not a build-up process of the failing transmission apparatus has been completed normally is based on periods of time each with a transmission line affected reported by the failing transmission apparatus to the center and line-setting information stored in the center, a power-supply interruption occurring during line setting can also be coped with. On the top of that, since a period of time with a transmission line affected is detected from alarm-history data collected by an adjacent transmission apparatus after the occurrence of a power-supply interruption, the detection can be completed in a short time due to the fact that the amount of the alarm-history data is small.

The present invention is by no means limited to the details of the preferred embodiments described above. The scope of the invention is defined to the last by the appended claims and all changes and modifications falling within the equivalence of the scope of the claims are therefore to be embraced by the invention.

What is claimed is:

1. A transmission apparatus comprising:

a power-supply unit;

first detection means for detecting a power-supply recovery of said power-supply unit;

request means which is used for transmitting a demanding command to an adjacent transmission apparatus completing line setting based on line-setting information to request said adjacent transmission apparatus to transmit alarm information when said first detection means detects said power-supply recovery, wherein said alarm information includes disabled-reception and recovered-reception times, that is, times at which reception of a signal in said transmission apparatus is disabled and recovered respectively;

first reception means for receiving said alarm information from said adjacent transmission apparatus; and second detection means for detecting a period of time with a transmission line affected between said disabled-reception time in said adjacent transmission apparatus by a failure of said power-supply unit and said recovered-reception time in said adjacent transmission apparatus by a recovery of said power-supply unit based on said alarm information received by said first reception means.

2. The transmission apparatus according to claim 1 wherein a main signal transmitted to said adjacent transmission apparatus is a synchronized frame comprising an overhead and a payload whereas said request means inserts said demanding command into said overhead.

3. The transmission apparatus according to claim 1 wherein said demanding command is again transmitted to said adjacent transmission apparatus which has been subjected to said line setting based on said line-setting information after carrying out said line setting of said adjacent transmission apparatus in case said alarm information received from said adjacent transmission apparatus indicates that reception of said adjacent transmission apparatus has not been recovered yet.

4. The transmission apparatus according to claim 1 further comprising:

third detection means for detecting whether or not communication with said adjacent transmission apparatus which has been subjected to said line setting based on said line-setting information is possible;

recording means for recording alarm information based on a result of detection produced by said third detection means into a history file wherein said alarm information includes times at which reception of a signal from said adjacent transmission apparatus is disabled and recovered;

second reception means for receiving an incoming demanding command from said adjacent transmission apparatus which has been subjected to said line setting based on said line-setting information; and transmission means for obtaining pieces of alarm information for said adjacent transmission apparatus transmitting said incoming demanding command from said history file and for transmitting said pieces of alarm information to said adjacent transmission apparatus transmitting said incoming demanding command in response to said incoming demanding command.

5. The transmission apparatus according to claim 4 wherein:

said apparatus further comprises a clock unit powered by said power-supply unit and used for updating time information as well as for recording a time t1 indicated by said time information as a time at which supply of electric power by said power-supply unit is interrupted;

said demanding command includes information requesting transmission of said alarm information obtained after said time t1; and said transmission means transmits said alarm information obtained after said time t1.

6. A transmission apparatus comprising:

a power-supply unit;

first detection means for detecting a power-supply recovery of said power-supply unit;

first output port connected to an adjacent transmission apparatus and used for outputting a first main signal;

second output port connected to said adjacent transmission apparatus and used for outputting a second main signal;

first input port connected to said adjacent transmission apparatus and used for inputting a third main signal;

second input port connected to said adjacent transmission apparatus and used for inputting a fourth main signal;

request means which is used for inserting a demanding command requesting transmission of alarm information related to said transmission apparatus itself into either said first or second main signal to be output respectively by said first or second output port recognized by said adjacent transmission apparatus completing line setting based on line-setting information as an element of a spare system and for transmitting either said first or second main signal including said demanding command to said adjacent transmission apparatus when said first detection means detects said power-supply recovery;

first reception means for receiving said alarm information which is transmitted from said adjacent transmission apparatus and included in either said third or fourth main signal input respectively by said first or second input port recognized by said transmission apparatus itself as an element of said spare system; and second detection means for detecting a period of time with a transmission line affected between said disabled-reception time in said adjacent transmission apparatus by a failure of said power-supply unit and said recovered-reception time in said adjacent transmission apparatus by a recovery of said power-supply unit, that is, times at which reception of a signal in said transmission apparatus is disabled and recovered respectively, included in said alarm information received by said first reception means.

7. The transmission apparatus according to claim 6 further comprising:

third detection means for detecting whether or not communication with said adjacent transmission apparatus which has been subjected to said line setting based on said line-setting information is possible;

recording means for recording alarm information based on a result of detection produced by said third detection means into a history file wherein said alarm information includes times at which reception of a signal from said adjacent transmission apparatus is disabled and recovered;

second reception means for receiving an incoming demanding command from said third or fourth main signal input respectively by said first or second input port recognized by said transmission apparatus itself as an element of said spare system; and transmission means for obtaining pieces of alarm information for said adjacent transmission apparatus transmitting said incoming demanding command from said history file and for inserting said pieces of alarm information into either said first or second main signal to be output respectively by said first or second output port recognized by said adjacent transmission apparatus as an element of said spare system prior to transmission of said first or second main signal including said pieces of alarm information to said adjacent transmission apparatus in response to said incoming demanding command.

8. A transmission apparatus comprising:

a power-supply unit;

first detection means for detecting a power-supply recovery of said power-supply unit;

first output port connected to an adjacent transmission apparatus and used for outputting a first main signal;

second output port connected to said adjacent transmission apparatus and used for outputting a second main signal;

first input port connected to said adjacent transmission apparatus and used for inputting a third main signal;

second input port connected to said adjacent transmission apparatus and used for inputting a fourth main signal;

first line termination means connected to said first output port and used as a first external interface;

second line termination means connected to said second output port and used as a second external interface;

third line termination means connected to said first input port and used as a third external interface;

fourth line termination means connected to said second input port and used as a fourth external interface;

request means which is used for transmitting a demanding command requesting transmission of alarm information related to said transmission apparatus itself on the basis of line-setting information to said adjacent transmission apparatus when said first detection means detects said power-supply recovery, first selector for selecting either said demanding command or data in accordance with a first select signal;

second selector for selecting either said demanding command or said data in accordance with a second select signal;

first payload-data insertion means for inserting a first signal output by said first selector into a payload of a synchronized frame and outputting said frame to said first line termination means;

second payload-data insertion means for inserting a second signal output by said second selector into a payload of said synchronized frame and outputting said frame to said second line termination means;

first payload-data termination means for separating payload data of said synchronized frame from a signal output by said third line termination means;

second payload-data termination means for separating payload data of said synchronized frame from a signal output by said fourth line termination means;

third selector for selecting a signal output by either of said first and second payload-data termination means in accordance with a third select signal;

first reception means for separating said alarm information transmitted by said adjacent transmission apparatus from a third signal output by said third selector;

control means for generating said first and third select signals; and second detection means for detecting a period of time with a transmission line affected between said disabled-reception time in said adjacent transmission apparatus by a failure of said power-supply unit and said recovered-reception time in said adjacent transmission apparatus by a recovery of said power-supply unit, that is, times at which reception of a signal in said adjacent transmission apparatus is disabled and recovered respectively, included in said alarm information received by said first reception means.

9. A communication network comprising a center and a plurality of transmission apparatuses each connected to said center by a communication line wherein:

each of said transmission apparatuses comprises:

a power-supply unit;

first detection means for detecting a power-supply recovery of said power-supply unit;

request means which is used for transmitting a demanding command to said center to request said center to transmit alarm information for each adjacent transmission apparatus completing line setting when said first detection means detects said power-supply recovery, wherein said alarm information includes disabled-reception and recovered-reception times, that is, times at which reception of a signal in said adjacent transmission apparatus is disabled and recovered respectively;

first reception means for receiving said alarm information from said center;

second detection means for detecting a period of time with said transmission line affected between said disabled-reception time in said adjacent transmission apparatus by a failure of said power-supply unit and said recovered-reception time in said adjacent transmission apparatus by a recovery of said power-supply unit included in said alarm information received by said first reception means; and first transmission means for transmitting said periods of time each with said transmission line affected to said center, whereas said center comprises:

recording means for receiving alarm information for each adjacent transmission apparatus from said transmission apparatuses and for recording said alarm information into a history file; and second transmission means for acquiring alarm information, which is related to said transmission apparatus transmitting said demanding command and is transmitted by said adjacent transmission apparatus of said transmission apparatuses transmitting said demanding command from said history file and for transmitting said acquired alarm information to said transmission apparatus transmitting said demanding command.

10. A communication network comprising a center and a plurality of transmission apparatuses each connected to said center by a communication line wherein:

each of said transmission apparatuses comprises:

a power-supply unit;

first detection means for detecting a power-supply recovery of said power-supply unit;

request means which is used for transmitting a demanding command to adjacent transmission apparatuses completing line setting based on line-setting information to request said adjacent apparatus to transmit alarm information when said first detection means detects said power-supply recovery, wherein said alarm information includes disabled-reception and recovered-reception times, that is, times at which reception of a signal in said adjacent transmission apparatus is disabled and recovered respectively;

first reception means for receiving said alarm information from said adjacent transmission apparatus;

second detection means for detecting a period of time with said transmission line affected between said disabled-reception time in each said adjacent transmission apparatus by a failure of said power-supply unit and said recovered-reception time in each said adjacent transmission apparatus by a recovery of said power-supply unit included in said alarm information received by said first reception means;

first transmission means which is used for transmitting said periods of time each with said transmission line affected to said center when all of said alarm information indicating that all said adjacent transmission apparatuses have recovered reception is received; and second reception means for receiving line-setting information from said center, whereas said center comprises:

recording means for recording line-setting information for each said transmission apparatus; and second transmission means for transmitting said line-setting information to each said transmission apparatus transmitting said periods of time each with said transmission line affected if said periods of time each with a transmission line affected for all adjacent transmission lines completing line setting based on said line-setting information recorded by said recording means have not been detected.

* * * * *